United States Patent
Holmberg et al.

(10) Patent No.: US 11,317,469 B2
(45) Date of Patent: Apr. 26, 2022

(54) RADIO ACCESS NETWORK NODE TECHNOLOGY

(71) Applicant: Telefonaktiebolaget LM Ericsson (publ), Stockholm (SE)

(72) Inventors: Per Holmberg, Stockholm (SE); Leif Johansson, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 82 days.

(21) Appl. No.: 16/767,279

(22) PCT Filed: Nov. 28, 2017

(86) PCT No.: PCT/SE2017/051184
§ 371 (c)(1),
(2) Date: May 27, 2020

(87) PCT Pub. No.: WO2019/108098
PCT Pub. Date: Jun. 6, 2019

(65) Prior Publication Data
US 2020/0329530 A1    Oct. 15, 2020

(51) Int. Cl.
*H04M 1/00*    (2006.01)
*H04B 1/38*    (2015.01)
(Continued)

(52) U.S. Cl.
CPC ........ *H04W 88/085* (2013.01); *G06F 3/0604* (2013.01); *G06F 3/0655* (2013.01); *G06F 3/0673* (2013.01)

(58) Field of Classification Search
CPC .. H04W 88/085; G06F 3/0604; G06F 3/0655; G06F 3/0673
See application file for complete search history.

(56) References Cited

U.S. PATENT DOCUMENTS

| 5,737,330 A | * | 4/1998 | Fulthorp | ............ | H04B 7/18539 |
| | | | | | 370/346 |
| 2014/0241224 A1 | * | 8/2014 | Fischer | ................ | H04B 7/0413 |
| | | | | | 370/294 |

(Continued)

FOREIGN PATENT DOCUMENTS

EP    3076750 A1    10/2016

OTHER PUBLICATIONS

Unknown, Author, "Concatenation for NR U-plane stack", 3GPP TSG-RAN WG2 Meeting #96; R2-167948; Reno, USA, Nov. 14-18, 2016, pp. 1-6.

(Continued)

*Primary Examiner* — Moustapha Diaby
(74) *Attorney, Agent, or Firm* — Murphy, Bilak & Homiller, PLLC

(57) ABSTRACT

There is provided a radio access network node (200) for a wireless communication system, wherein the radio access network node (200) is configured to be implemented as a clustered system comprising a cluster of interconnected network node sub-modules (210). Each network node sub-module (210) comprises a processing unit (212) and memory (214), and the memory (214) comprises a data structure. At least one of the network node sub-modules (210) is configured to manage at least one radio and/or antenna unit (220). The radio access network node (200) also has a communication mechanism for communication between the network node sub-modules (210), and the communication mechanism is configured to enable a direct memory write operation from at least one network node sub-module into the data structure of at least one other network node sub-module.

20 Claims, 32 Drawing Sheets

(51) Int. Cl.
*H04W 88/08* (2009.01)
*G06F 3/06* (2006.01)

(56) References Cited

U.S. PATENT DOCUMENTS

2014/0241315 A1    8/2014   Niu et al.
2016/0037580 A1    2/2016   Shor et al.
2016/0262179 A1*   9/2016   Choi .................. H04W 74/004

OTHER PUBLICATIONS

Unknown, Author, "Update to Key Issue 19: Architecture impacts when using virtual environments", SA WG2 Meeting #116bis; S2-164795; Sanya, China, Aug. 29-Sep. 2, 2016, pp. 1-4.

* cited by examiner

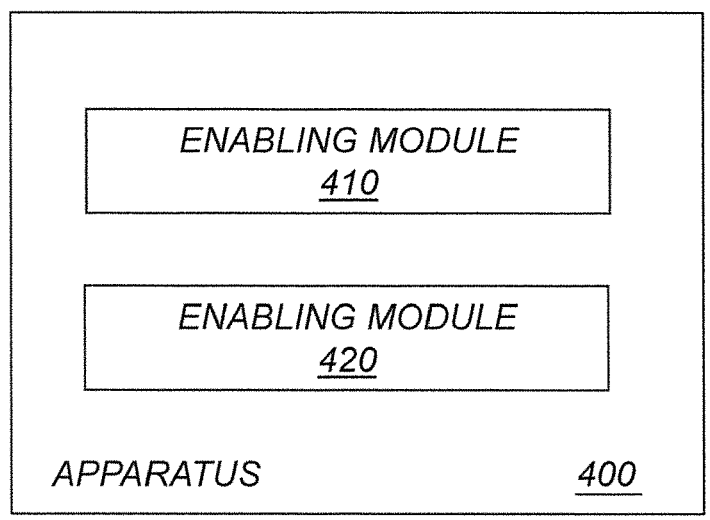
Fig. 26
Fig. 25
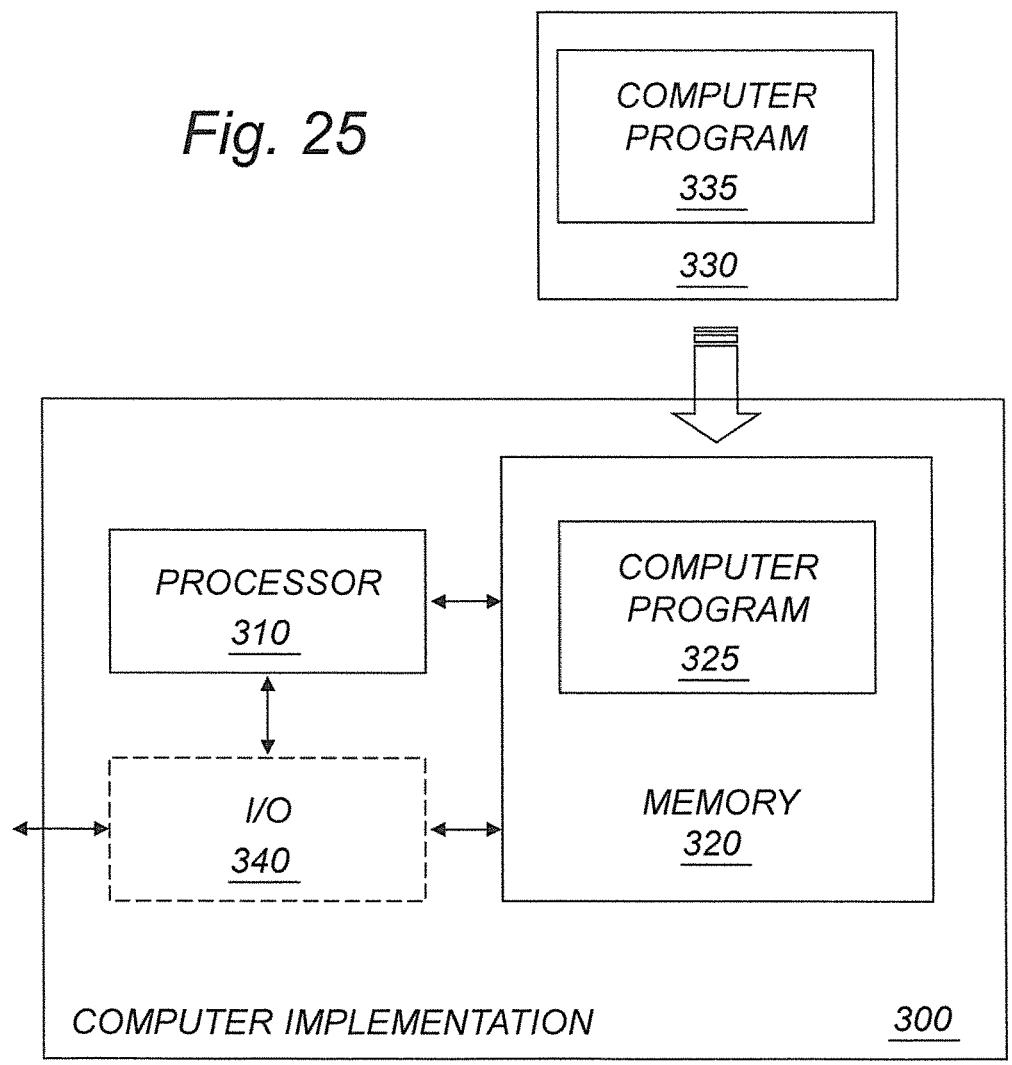

RADIO ACCESS NETWORK NODE TECHNOLOGY

TECHNICAL FIELD

The proposed technology generally relates to wireless communications technology, and more particularly to a radio access network node for a wireless communication system, a corresponding method of operating such a network node, as well as corresponding computer programs and computer-program products, and corresponding apparatuses.

BACKGROUND

The concept of distributed base stations, or more generally distributed radio access network nodes, is based on using remote radio heads (RRH), or more generally remote radio and/or antenna units, that are connected to a common digital baseband module or unit, which handles baseband and/or control processing. This concept is now being used significantly, e.g. in the fast expanding heterogeneous wireless networks, where the baseband module and the remote radio heads may be separated by long distances.

FIG. 1 is a schematic diagram illustrating a conventional distributed radio base station for a wireless communication system. The overall base station 100 comprises a common digital baseband module 110 connected to remote radio and/or antenna units 120, commonly referred to as remote radio heads. Standard interface protocols to connect the digital baseband module and the typically analogue radio and/or antenna units has received special attention and is being intensely pursued by the industry. These interfaces between the baseband module and the remote radio heads are termed radio interfaces such as the Common Public Radio Interface (CPRI) and eCPRI. These radio interfaces help in realizing the deployment of distributed base stations and offer significant cost savings to the wireless service providers. The use of radio interfaces also offers tremendous flexibility in network design and deployment. However, distributed base stations are nevertheless based on a centralized digital processing protocol with a common baseband module shared by a set of remote radio heads, where data to the radio heads are distributed from a central point and/or data from the radio heads are collected to this central point and processed within one circuit or one board.

Existing base station solutions therefore may still have problems associated with centralized implementations in that they are not always easily scalable, they may have single point of failures, downtime at software upgrades and so forth.

By way of example:
- When it comes to power efficiency, scaling down a centralized solution is very hard and typically lead to very complicated partial power-down of circuit boards and even within Application Specific Integrated Circuits (ASICs).
- Faults at a central function may bring the whole system down.
- Software upgrades may also bring the whole system down. This is true even if the change is done at low traffic when there are plenty of free resources.
- Centralized solutions tend to drive real time requirements, such as high transmission speeds and cost, and may require leading edge technology (e.g. latest silicon process technology, as well as large and costly chips) resulting in high cost solutions but also very high risk projects.

There is thus a general need for improvements when it comes to building radio access network nodes such as base stations.

SUMMARY

It is a general object to find improved ways of building, implementing and/or operating radio access network nodes.

It is a specific object to provide a radio access network node for a wireless communication system.

Another object is to provide a method of operating a radio access network node for a wireless communication system.

Yet another object is to provide a computer program for operating, when executed, a radio access network node for a wireless communication system, and a corresponding a computer-program product.

Yet another object is to provide a computer program for operating, when executed, a network node sub-module, and a corresponding a computer-program product.

It is also an object to provide an apparatus for operating, when executed, a radio access network node for a wireless communication system.

Another object is to provide an apparatus for operating, when executed, a network node sub-module.

These and other objects are met by embodiments of the proposed technology.

According to a first aspect, there is provided a radio access network node for a wireless communication system. The radio access network node is configured to be implemented as a clustered system comprising a cluster of at least two interconnected network node sub-modules, each of which comprises a processing unit and memory, and the memory comprises a data structure. At least one of the network node sub-modules is configured to manage at least one radio and/or antenna unit. The radio access network node has a communication mechanism for communication between the network node sub-modules, and the communication mechanism is configured to enable a direct memory write operation from at least one network node sub-module into the data structure of at least one other network node sub-module.

In this way, a highly effective clustered radio access network node such as a base station can be provided for a wireless communication system. The proposed technology enables high performance, low latency communication between network node sub-modules in the cluster of interconnected network node sub-modules.

According to a second aspect, there is provided a method of operating a radio access network node for a wireless communication system. The radio access network node is implemented as a clustered system comprising a cluster of at least two interconnected network node sub-modules, each of which comprises a processing unit and memory, and the memory comprises a data structure. The method comprises the steps of:
- at least one of the network node sub-modules managing at least one radio and/or antenna unit, and
- at least one of the network node sub-modules performing a direct memory write operation into the data structure of at least one other network node sub-module.

According to a third aspect, there is provided a computer program for operating, when executed, a radio access network node for a wireless communication system. The radio access network node is implemented as a clustered system comprising a cluster of at least two interconnected network node sub-modules. The computer program comprises instructions, which when executed by at least one processor, cause the at least one processor to:
- enable at least one of the network node sub-modules to manage at least one radio and/or antenna unit, and
- enable at least one of the network node sub-modules to perform a direct memory write operation into a data structure of at least one other network node sub-module.

By way of example, the computer program is implemented as a distributed application for execution on the cluster of interconnected network node sub-modules.

According to a fourth aspect, there is provided a computer program for operating, when executed, a network node sub-module of a clustered radio access network node comprising a cluster of at least two interconnected network node sub-modules. The computer program comprises instructions, which when executed by at least one processor, cause the at least one processor to:
- enable the network node sub-module to manage at least one radio and/or antenna unit, and
- enable the network node sub-module to perform a direct memory write operation into a data structure of at least one other network node sub-module.

According to a fifth aspect, there is provided a computer-program product comprising a computer-readable medium having stored thereon a computer program of any of the third or fourth aspect.

According to a sixth aspect, there is provided an apparatus for operating a radio access network node for a wireless communication system, wherein the radio access network node is implemented as a clustered system comprising a cluster of at least two interconnected network node sub-modules. The apparatus comprises:
- a module for enabling at least one of the network node sub-modules to manage at least one radio and/or antenna unit, and
- a module for enabling at least one of network node sub-modules to perform a direct memory write operation into a data structure of at least one other network node sub-module.

According to a seventh aspect, there is provided an apparatus for operating a network node sub-module of a clustered radio access network node comprising a cluster of at least two interconnected network node sub-modules. The apparatus comprises:
- a module for enabling the network node sub-module to manage at least one radio and/or antenna unit, and
- a module for enabling the network node sub-module to perform a direct memory write operation into a data structure of at least one other network node sub-module.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which:

FIG. 25 is a schematic diagram illustrating an example of a computer implementation according to an embodiment.

FIG. 26 is a schematic diagram illustrating an example of an apparatus for operating, when executed, a radio access network node and/or a network node sub-module for a wireless communication system.

DETAILED DESCRIPTION

Figure 1:
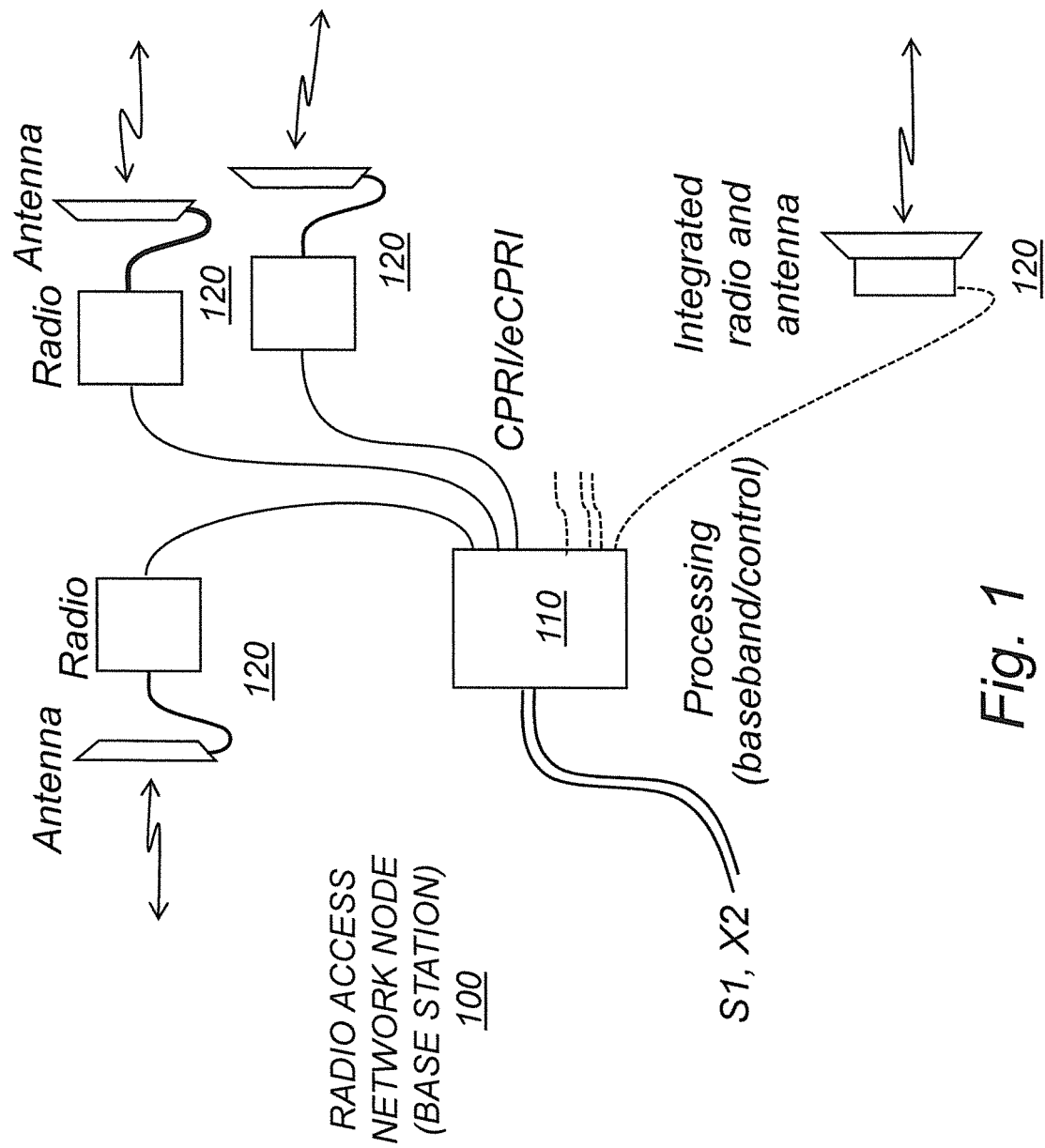
FIG. 1 is a schematic diagram illustrating a conventional distributed radio base station for a wireless communication system.

Throughout the drawings, the same reference designations are used for similar or corresponding elements.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

As used herein, the non-limiting term "radio access network node" may refer to base stations, various types of access points, radio network nodes, radio access controllers, and the like. In particular, the non-limiting term "base station" may refer to any kind of base stations and/or access points. In particular, the term "base station" may encompass different types of radio base stations including standardized base station functions such as Node Bs, or evolved Node Bs (eNBs), gNodeBs, and also macro/micro/pico radio base stations, home base stations, also known as femto base stations, relay nodes, repeaters, radio access points, Base Transceiver Stations (BTSs), and radio control nodes controlling one or more Remote Radio Units (RRUs), or the like.

As used herein, the non-limiting terms "wireless communication device", "station", "User Equipment (UE)", and "terminal" may refer to a mobile phone, a cellular phone, a Personal Digital Assistant (PDA), equipped with radio communication capabilities, a smart phone, a laptop or Personal Computer (PC), equipped with an internal or external mobile broadband modem, a tablet with radio communication capabilities, a target device, a device to device UE, a machine type UE or UE capable of machine to machine communication, Customer Premises Equipment (CPE), Laptop Embedded Equipment (LEE), Laptop Mounted Equipment (LME), USB dongle, a portable electronic radio communication device, a sensor device equipped with radio communication capabilities or the like. In particular, the term "wireless communication device" should be interpreted as non-limiting terms comprising any type of wireless device communicating with a network node in a wireless communication system and/or possibly communicating directly with another wireless communication device. In other words, a wireless communication device may be any device equipped with circuitry for wireless communication according to any relevant standard for communication.

As used herein, the term "network device" may refer to any device located in connection with a communication network, including but not limited to devices in access networks, core networks and similar network structures. The term network device may also encompass cloud-based network devices.

As mentioned, existing radio access network node solutions (even when part of a distributed solution) may have problems associated with centralized implementations in that they are not always easily scalable, they may have single point of failures, downtime at software upgrades and so forth.

Figure 2:
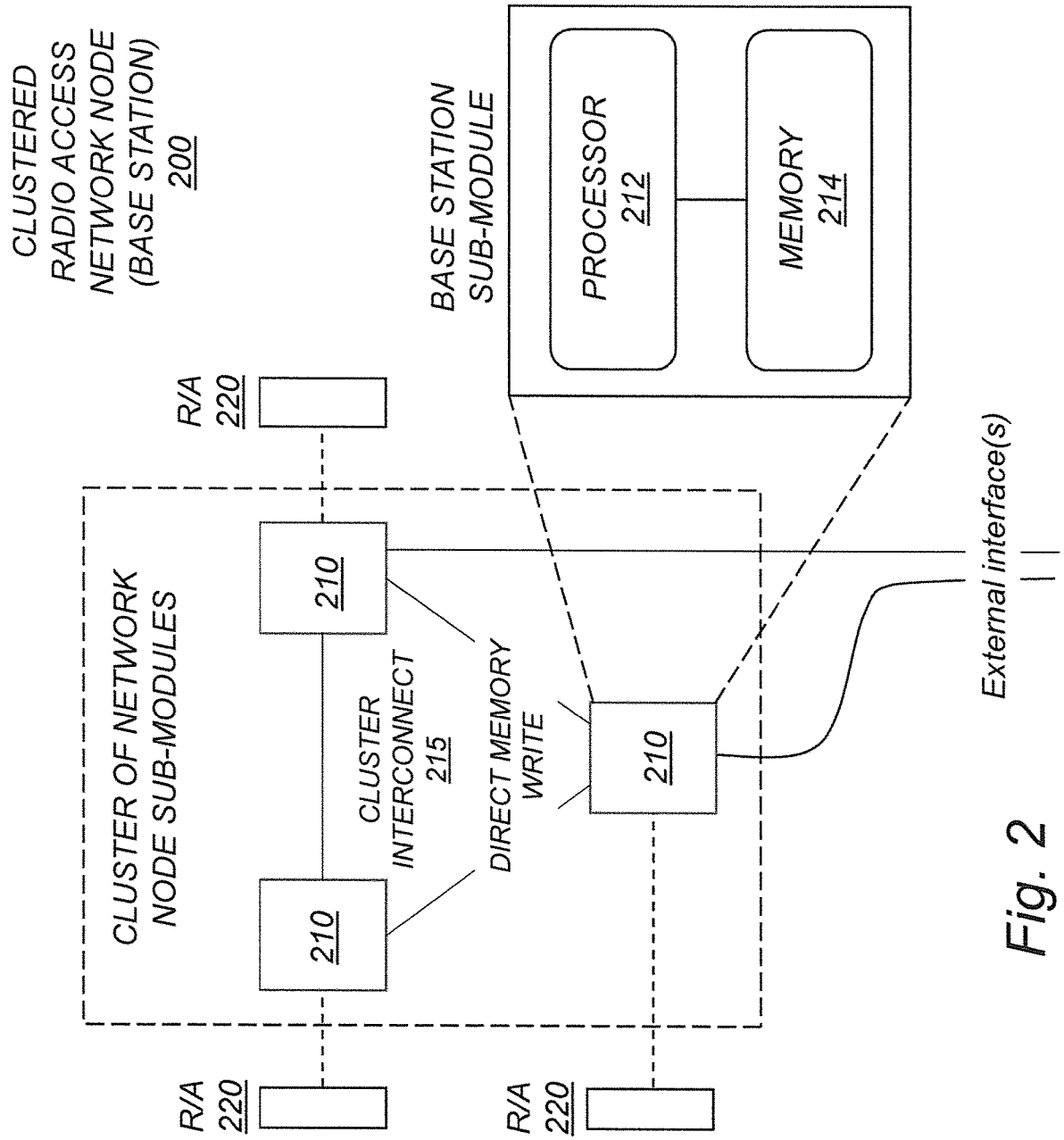
FIG. 2 is a schematic diagram illustrating an example of a clustered radio access network node according to an embodiment.

FIG. 2 is a schematic diagram illustrating an example of a clustered radio access network node according to an embodiment. The radio access network node 200 is configured to be implemented as a clustered system comprising a cluster of at least two interconnected network node sub-modules 210, each of which comprises a processing unit such as a processor 212 and memory 214, and the memory 214 comprises a data structure. At least one of the network node sub-modules 210 is configured to manage at least one radio and/or antenna (R/A) unit 220. The radio access network node 200 has a communication mechanism, also referred to as a cluster interconnect 215, for communication between the network node sub-modules 210, and the communication mechanism is configured to enable a direct memory write operation from at least one network node sub-module 210 into the data structure of at least one other network node sub-module 210.

In this way, a highly effective clustered radio access network node such as a base station can be provided for a wireless communication system. The proposed technology enables high performance, low latency communication between network node sub-modules in the cluster of interconnected network node sub-modules.

In other words, at least part of the radio access network node functionality may be configured to be distributed in the cluster of interconnected network node sub-modules.

The network node sub-modules may sometimes simply be referred to as sub-modules, and/or members and/or participants and/or units.

For example, the radio access network node may be a base station and the network node sub-modules may be base station sub-modules.

By way of example, the radio access network node 200 may be configured to be implemented as a distributed application running on the cluster of interconnected network node sub-modules 210. For example, cluster middleware can be used for implementing functions for supporting distribution of information, replicating data and keeping data consistency, achieving quorum, electing leaders and so forth. As an example, the distributed application may be an application configured to perform baseband processing, packet processing, and/or control processing for the radio access network node.

For example, at least one of the network node sub-modules 210 may be configured to perform baseband processing, packet processing and/or control processing. In a sense, the conventional baseband module may be replaced by one or more of the interconnected network node sub-modules.

It should also be understood that there may be additional network node sub-modules that may not be configured to manage any radio and/or antenna (R/A) unit, but may be customized for specific digital processing.

It should also be understood that the term radio and/or antenna unit may refer to radio units, antenna units and any combination thereof, including conventional radio and antenna units, remote radio heads and radio dots, as well as analog and/or digital radio parts. In this regard, it must also be understood that the network node sub-modules may include converter(s) for providing digital and/or analog output signals for the radio and/or antenna units, all depending on the desired choice of implementation.

One or more of the network node sub-modules may also be connected to external interfaces such as S1 and/or X2 interfaces.

As an example, at least one of the network node sub-modules 210 may be configured to manage at least one cell within the wireless communication system.

In a particular example, the processing unit such as the processor 212 of at least one of the network node sub-module 210 is configured to perform a direct memory write operation for storing data into the data structure of at least one other network node sub-module.

For example, the processing unit of at least one of the network node sub-modules 210 may be configured to directly address a storage location in the data structure of at least one other network node sub-module.

Optionally, the processing unit of at least one of the network node sub-modules 210 may be configured to copy-write data into a cache or other dedicated local memory of the processing unit of said at least one other network node sub-module or to write the data directly into the cache or other dedicated local memory of the processing unit of said at least one other network node sub-module.

Figure 15:
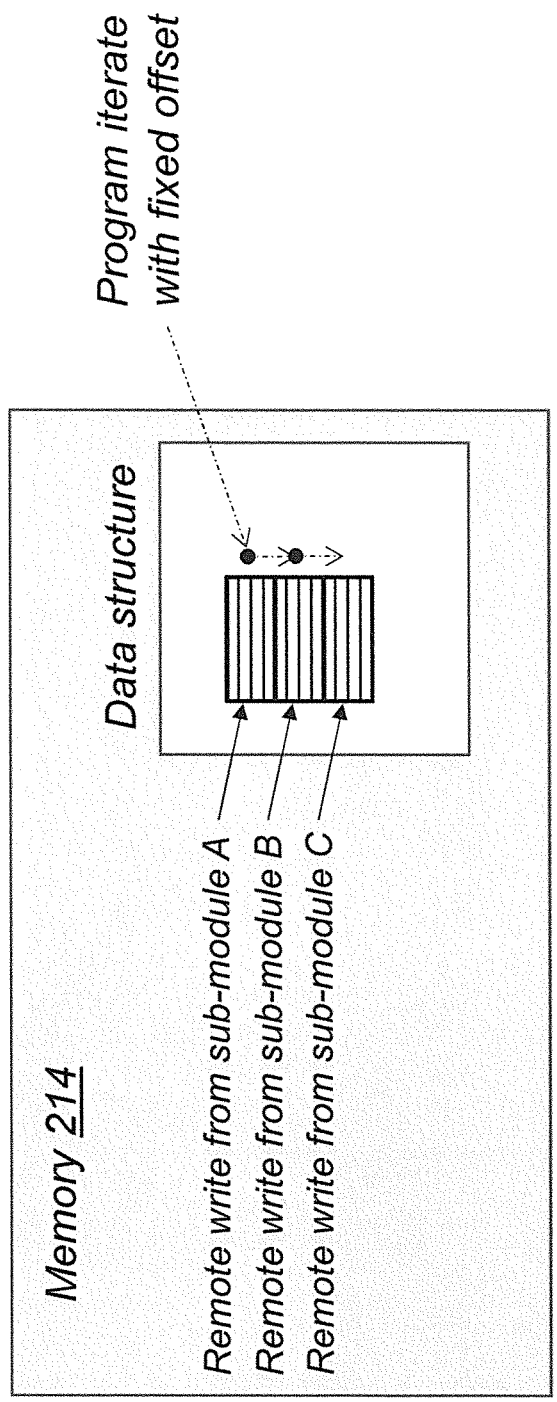
FIG. 15 is a schematic diagram illustrating an example of the data structure within the memory of a network node sub-module, with separate areas for each unit/participant sharing information.

In another particular example, the data structure in the memory 214 of at least one of the network node sub-modules 210 comprises a separate area dedicated for each of at least a subset of the network node sub-modules of the cluster, as illustrated in FIG. 15.

By way of example, at least a subset of the network node sub-modules 210 may be configured to cooperate on a shared execution task, and at least one of the cooperating network node sub-modules may be configured to replicate data to be shared as a copy by using remote write into the data structure of at least one of the other cooperating network node sub-modules 210.

Optionally, at least one of the cooperating network node sub-modules 210 may be configured to perform, in response to an update of its own data structure with data to be shared, a multicasting write procedure to replicate the data in the data structures of the other cooperating network node sub-modules.

Although the radio access network node may be configured as a distributed application running on a cluster of interconnected network node sub-modules, the actual physical organization of the sub-modules may be either centralized or distributed.

Figure 8:
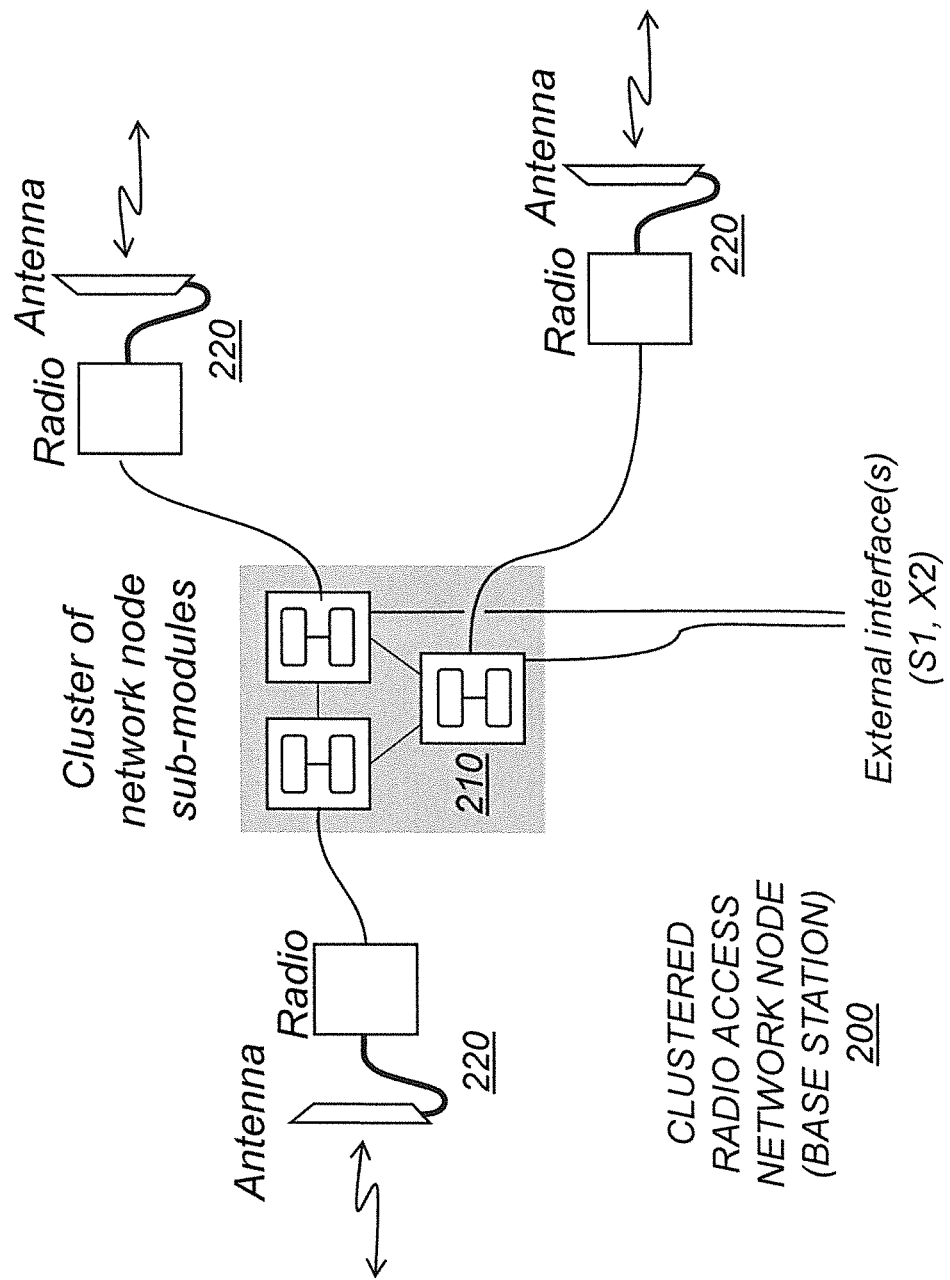
FIG. 8 is a schematic diagram illustrating a particular example of a clustered radio access network node according to an embodiment.
Figure 9:
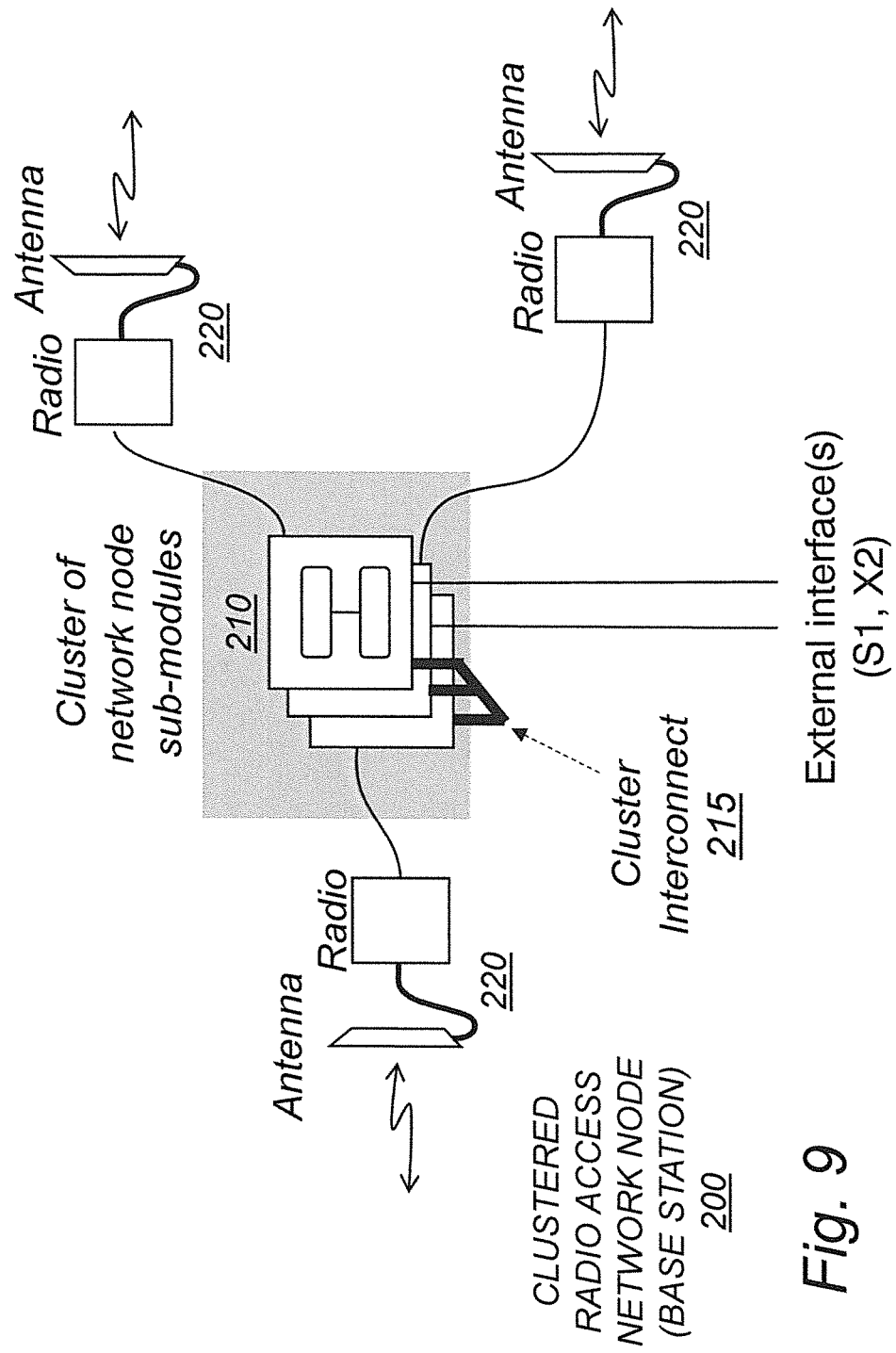
FIG. 9 is a schematic diagram illustrating another particular example of a clustered radio access network node according to an embodiment.
Figure 10:
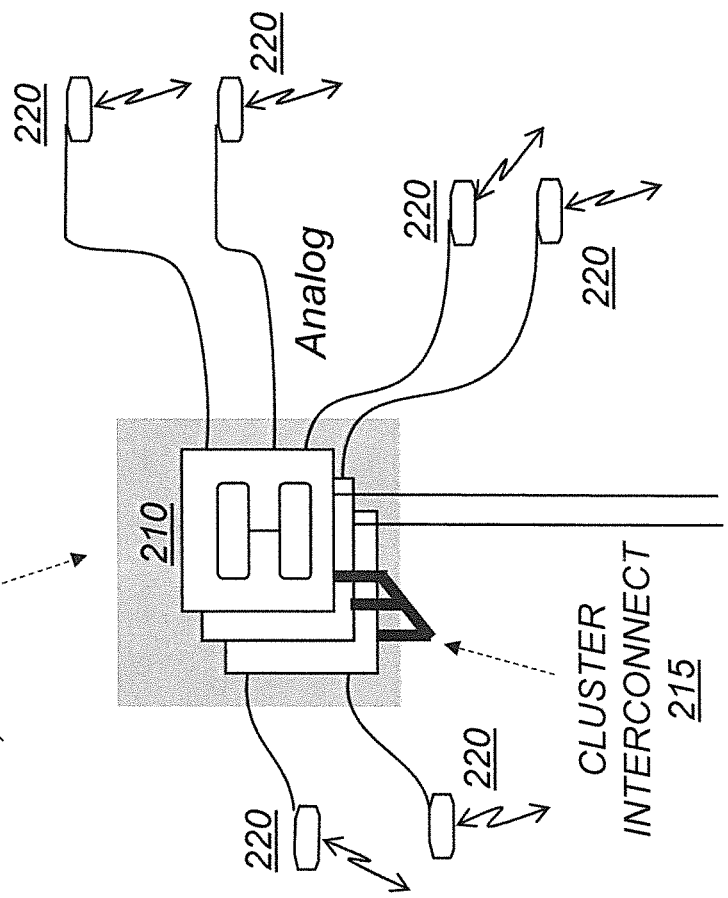
FIG. 10 is a schematic diagram illustrating yet another particular example of a clustered radio access network node according to an embodiment.

As an example, the cluster of interconnected network node sub-modules 210 may be physically centralized in the same location, e.g. as schematically illustrated in FIG. 8, FIG. 9 and FIG. 10. For example, the sub-modules may be located in the same cabinet or room.

Figure 11:
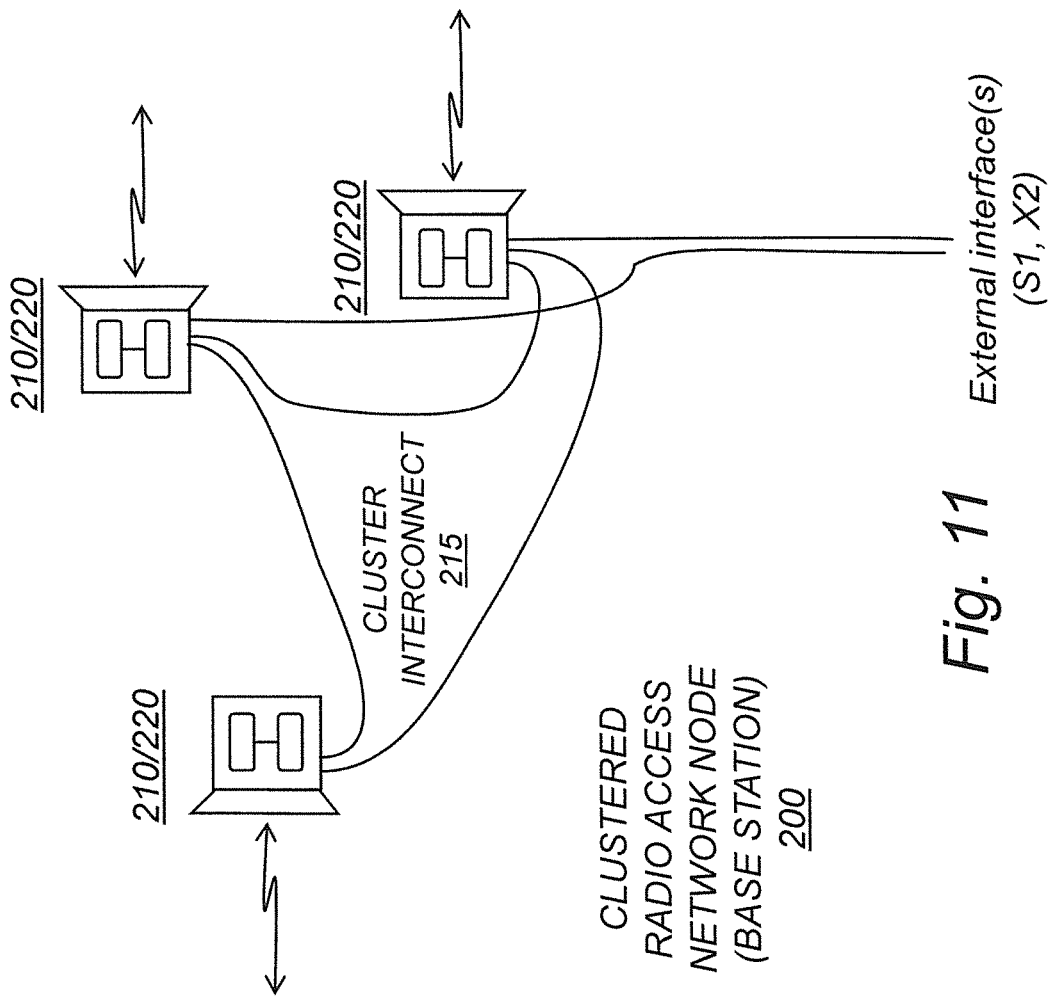
FIG. 11 is a schematic diagram illustrating still another particular example of a clustered radio access network node according to an embodiment.

Alternatively, the cluster of interconnected network node sub-modules 210 may be physically distributed. For example, the radio and/or antenna units 220 of the radio access network node 200 may be distributed and each of at least a subset of the network node sub-modules 210 may be integrated physically with the corresponding radio and/or antenna unit 220, e.g. as schematically illustrated in FIG. 11.

By way of example, the network node sub-modules 210 may be configured to communicate based on a cluster interconnect 215 using direct links and/or indirect links between the network node sub-modules 210.

In a particular example, the network node sub-modules 210 are configured to communicate based on a cluster interconnect 215 using a full mesh with direct links between the network node sub-modules 210.

Alternatively, the network node sub-modules 210 may be configured to communicate based on a cluster interconnect 215 using a mesh with direct links and/or multi-hop links between the network node sub-modules 210.

If desired, the cluster interconnect may be configured as a redundant interconnect with one or more reserve or alternative paths in order to be able to handle interconnection faults.

In another particular example, the network node sub-modules 210 are configured to communicate based on a cluster interconnect 215 using a switched network to interconnect the network node sub-modules 210.

In a particular example, the cluster interconnect 215 may be based on Peripheral Component Interconnect, PCI, and/or Ethernet technology.

Figure 3:
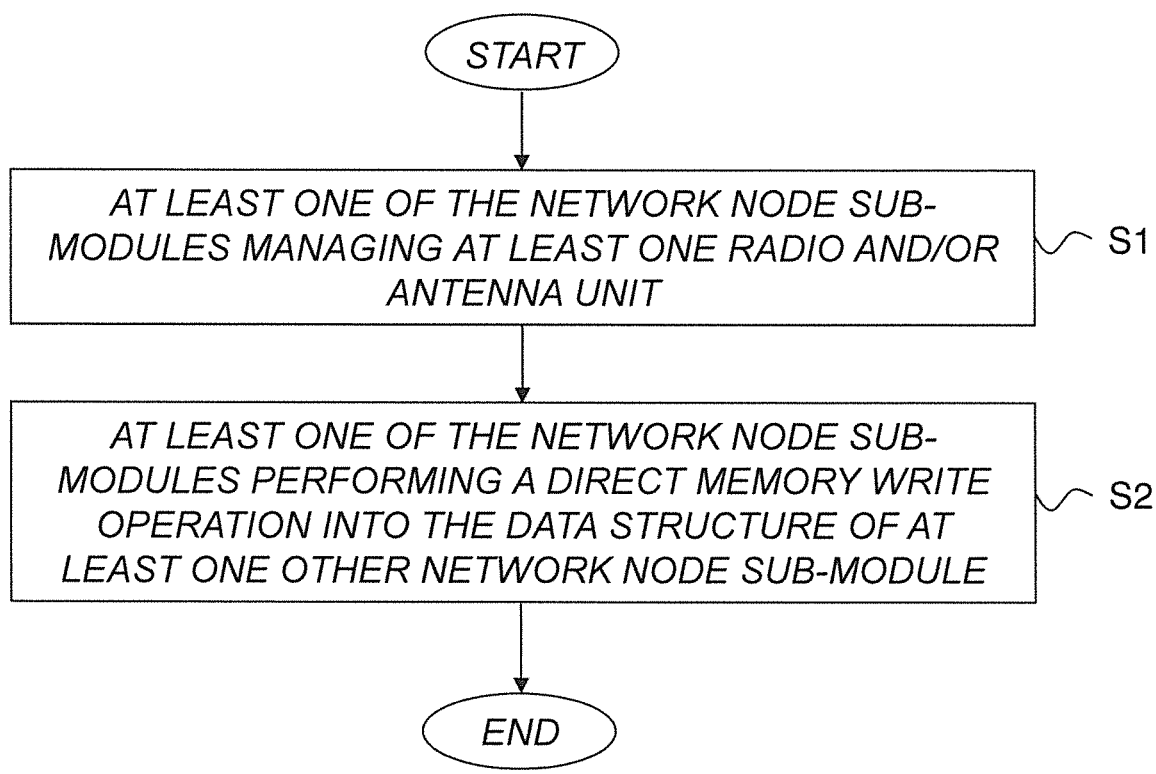
FIG. 3 is a schematic diagram illustrating an example of a method of operating a radio access network node according to an embodiment.

FIG. 3 is a schematic diagram illustrating an example of a method of operating a radio access network node according to an embodiment. The radio access network node is implemented as a clustered system comprising a cluster of at least two interconnected network node sub-modules, each of which comprises a processing unit and memory, and the memory comprises a data structure. The method comprises the steps of:

S1: at least one of the network node sub-modules managing at least one radio and/or antenna unit, S2: at least one of the network node sub-modules performing a direct memory write operation into the data structure of at least one other network node sub-module.

By way of example, a distributed radio base application may be executed on the cluster of interconnected network node sub-modules for providing at least part of the radio base functionality.

Figure 4:
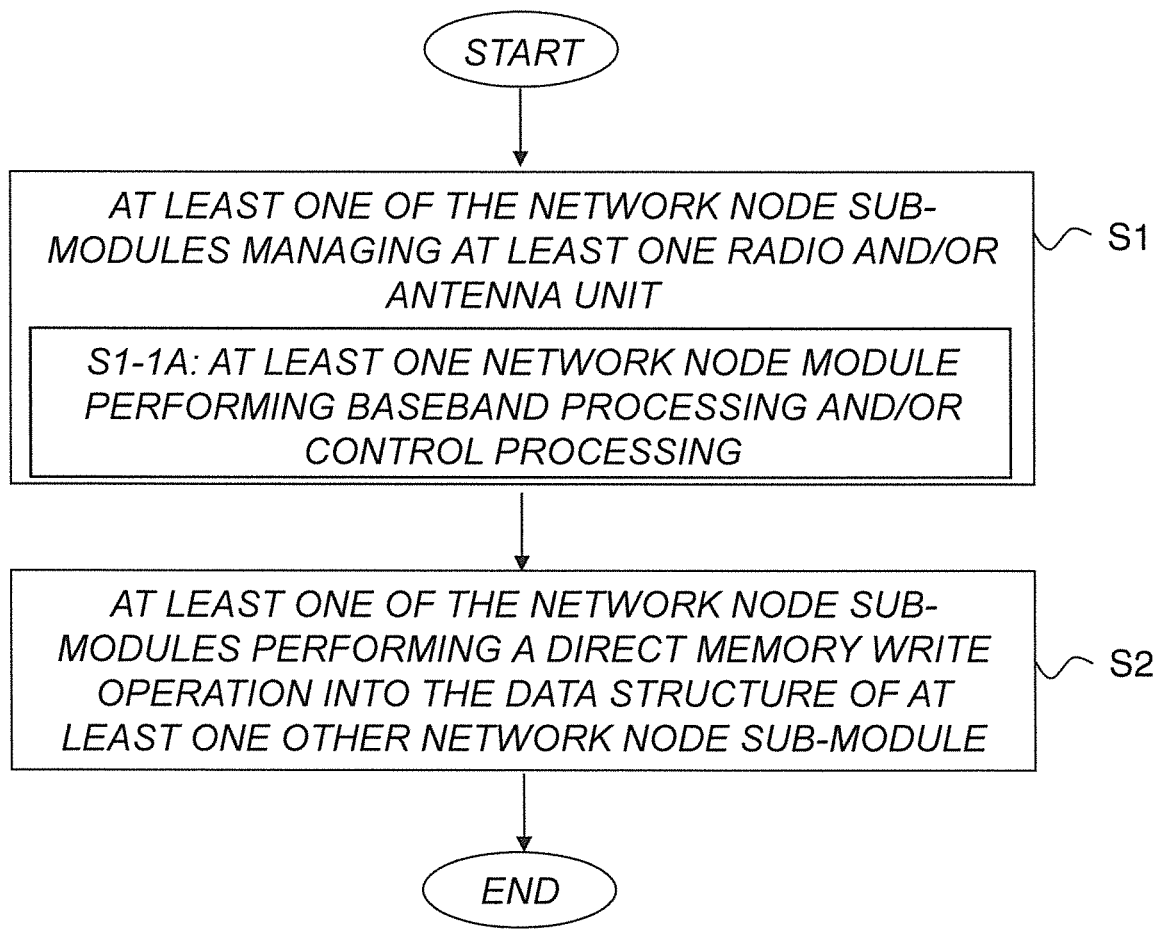
FIG. 4 is a schematic diagram illustrating another example of a method of operating a radio access network node according to an embodiment.

FIG. 4 is a schematic diagram illustrating another example of a method of operating a radio access network node according to an embodiment. In this example, the step S1 of managing at least one radio and/or antenna unit comprises the step S1-1A of at least one network node sub-module performing baseband processing, packet processing and/or control processing.

Figure 5:
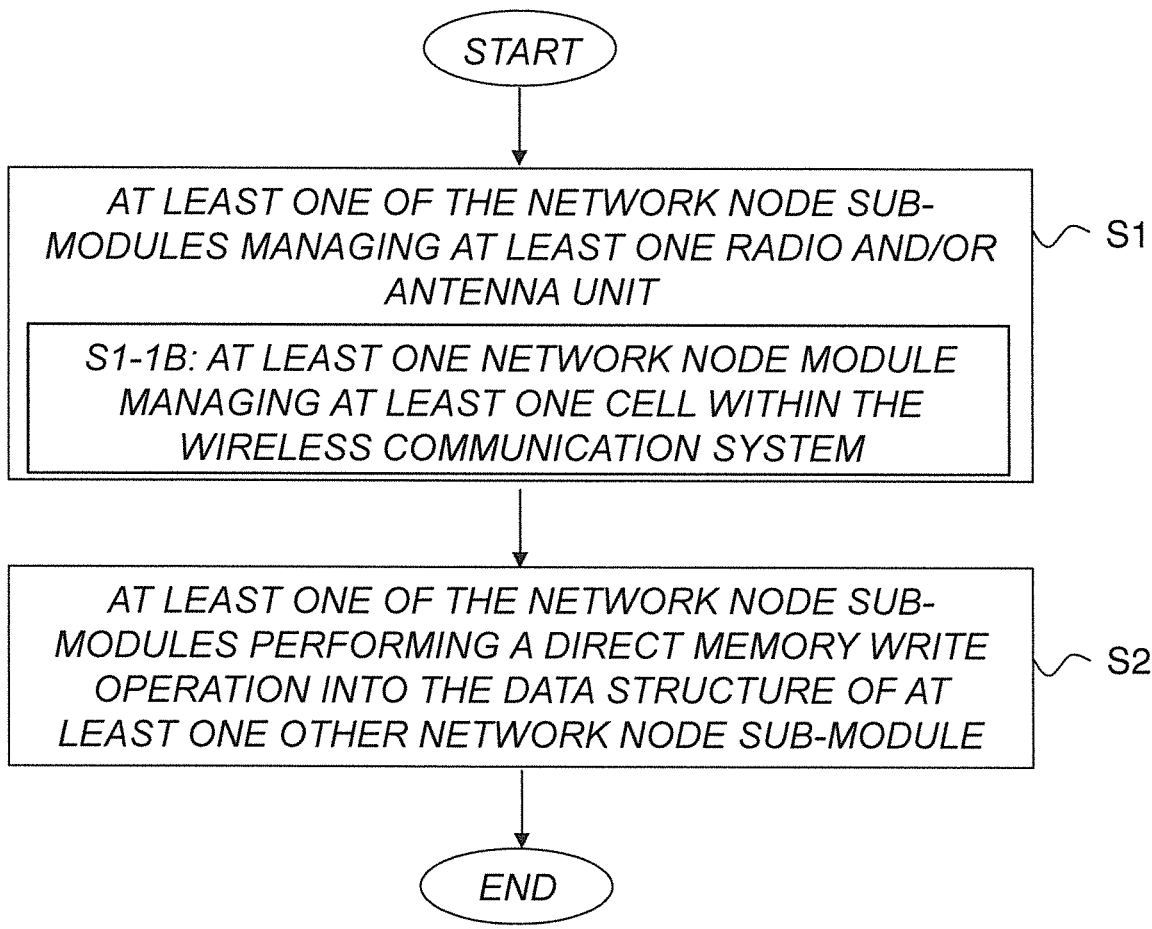
FIG. 5 is a schematic diagram illustrating yet another example of a method of operating a radio access network node according to an embodiment.

FIG. 5 is a schematic diagram illustrating yet another example of a method of operating a radio access network node according to an embodiment. In this example, the step S1 of managing at least one radio and/or antenna unit comprises the step S1-1B of at least one network node sub-module managing at least one cell within the wireless communication system.

Figure 6:
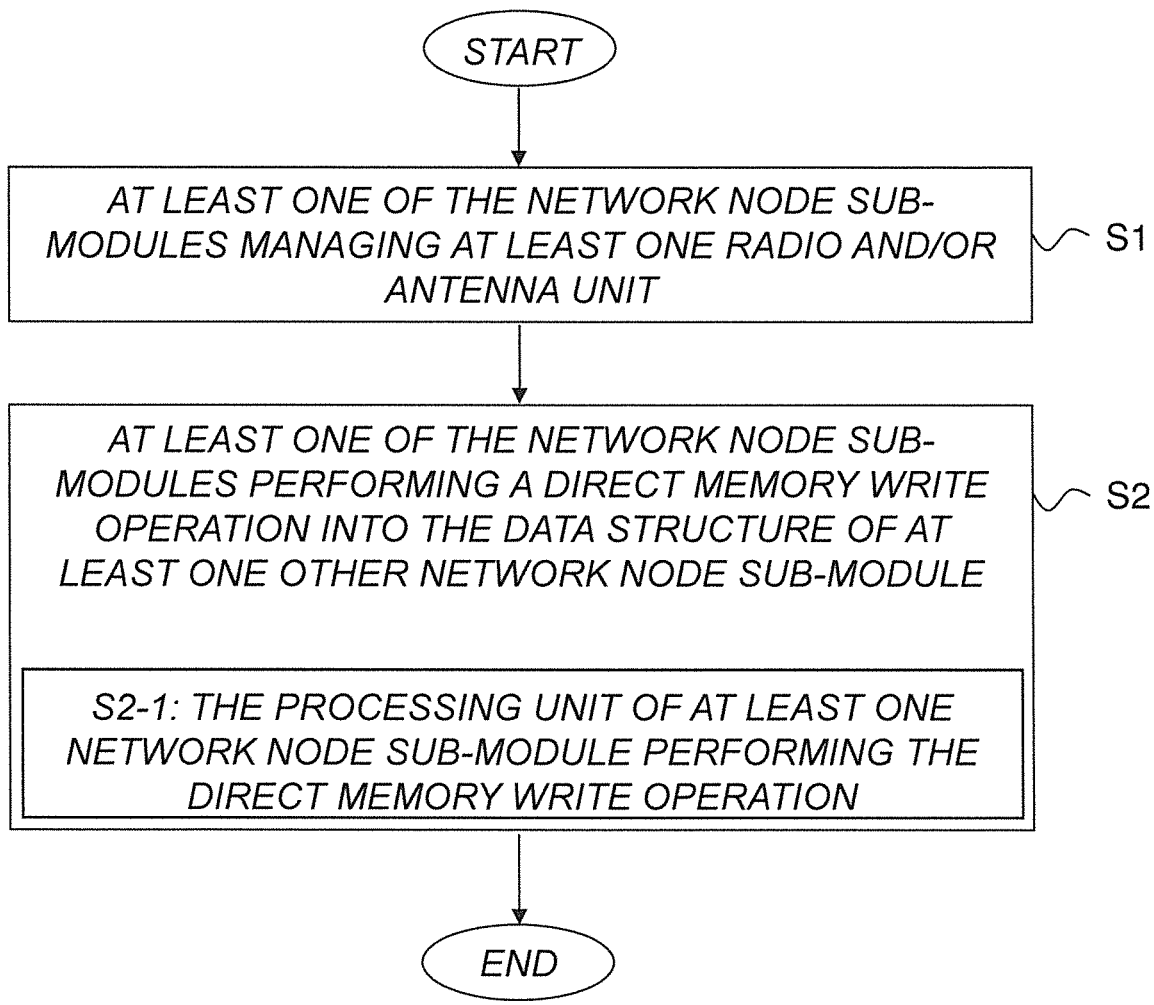
FIG. 6 is a schematic diagram illustrating still another example of a method of operating a radio access network node according to an embodiment.

FIG. 6 is a schematic diagram illustrating still another example of a method of operating a radio access network node according to an embodiment. In this example, the step S2 of performing a direct memory write operation comprises the step S2-1 of the processing unit of at least one network node sub-module performing the direct memory write operation for storing data into the data structure of at least one other network node sub-module.

Figure 7:
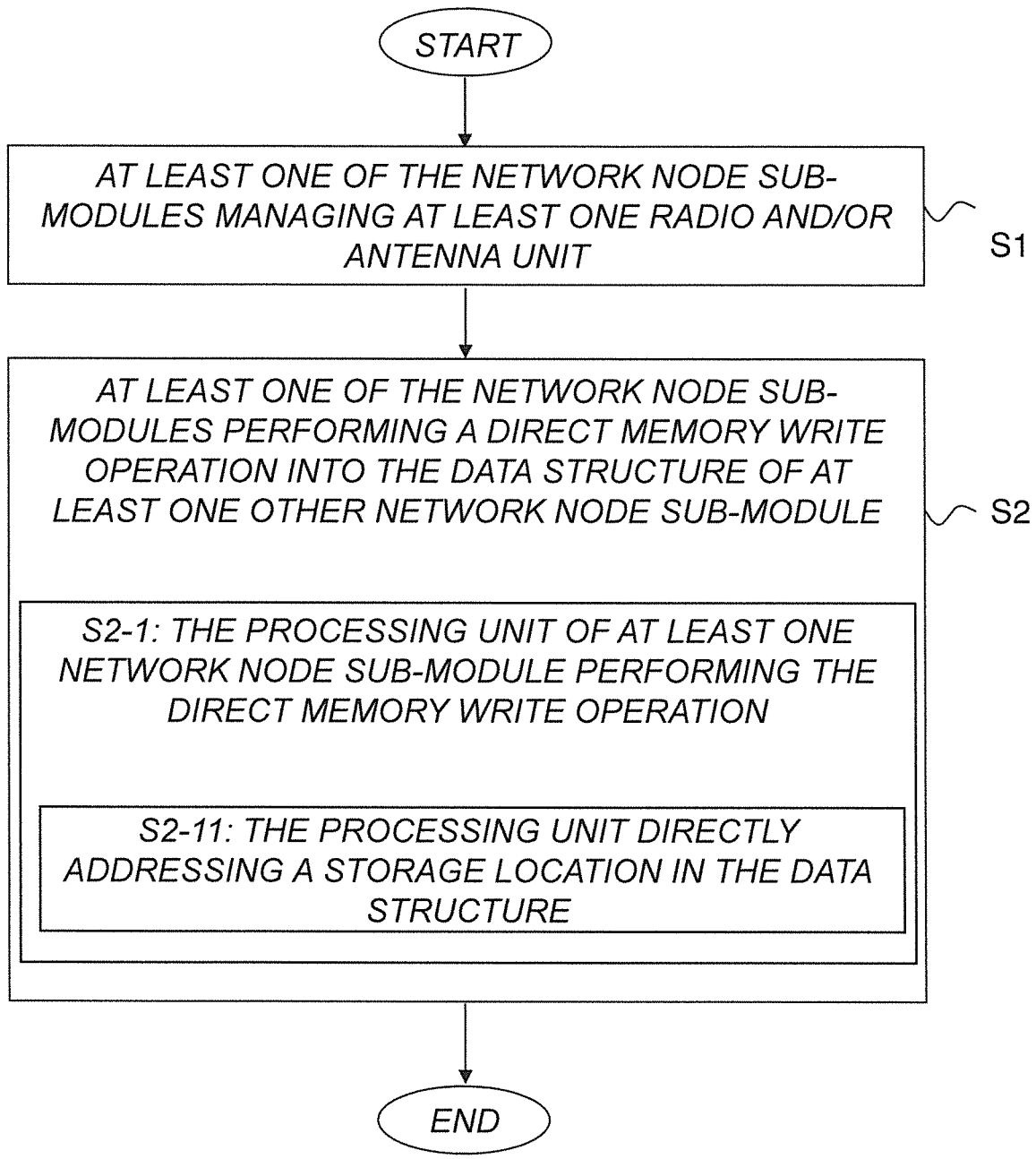
FIG. 7 is a schematic diagram illustrating still another more detailed example of a method of operating a radio access network node according to an embodiment.

FIG. 7 is a schematic diagram illustrating still another more detailed example of a method of operating a radio access network node according to an embodiment. In this example, the step S2-1 of the processing unit of at least one network node sub-module performing S2-1 the direct memory write operation comprises the step S2-11 of the processing unit of said at least one network node sub-module directly addressing a storage location in the data structure of at least one other network node sub-module.

In a particular example, the processing unit of at least one network node sub-module performs a copy-write of data into a cache or other dedicated local memory of the processing unit of said at least one other network node sub-module or writes the data directly into the cache or other dedicated local memory of the processing unit of said at least one other network node sub-module.

Optionally, the data structure in the memory of at least one of the network node sub-modules is organized with a separate area dedicated for each of at least a subset of the network node sub-modules of the cluster.

By way of example, at least a subset of the network node sub-modules may cooperate on a shared execution task, and data to be shared among the cooperating network node sub-modules may be replicated as a copy by using remote write into the data structure of at least one of the other cooperating network node sub-modules.

For example, at least one of the cooperating network node sub-modules may perform, in response to an update of its own data structure with data to be shared, a multicasting write procedure to replicate the data in the data structures of the other cooperating network node sub-modules.

FIG. 8 is a schematic diagram illustrating a particular example of a clustered radio access network node 200 according to an embodiment. In this example, the cluster of interconnected network node sub-modules 210 may be physically centralized in the same location. For example, the sub-modules may be located in the same cabinet/rack or room.

FIG. 9 is a schematic diagram illustrating another particular example of a clustered radio access network node according to an embodiment. In this example, the network node sub-modules 210 may also be physically centralized in the same location, such as a cabinet or rack.

As an example, the network node sub-modules 210 may be based on blade processors or blade servers, as schematically illustrated in FIG. 9 and FIG. 10.

The network node sub-modules 210 may be interconnected to each other via a cluster interconnect, e.g. based on PCI or Ethernet.

The network node sub-modules 210 may be interconnected to respective radio and/or antenna units 220 such as remote radio heads, e.g. via standardized radio interfaces such as CPRI and/or eCPRI.

FIG. 10 is a schematic diagram illustrating yet another particular example of a clustered radio access network node according to an embodiment. In this particular example, each network node sub-module 210 is configured to perform control processing, digital baseband processing, but may also include analog-to-digital (A/D) and/or digital-to-analog (D/A) converters to provide analog output signal(s) for the respective antenna unit(s) 220. The antenna units 220 may still include functions for radio frequency conversion and/or power amplification, in addition to the antenna elements.

The solution illustrated in FIG. 10 may be particularly useful for Radio Dot Systems (RDS).

As shown FIG. 8, FIG. 9 and FIG. 10, at least part of the radio access network node functionality such as baseband processing and/or control processing is executed distributed in a cluster with a cluster interconnect. A directly connected mesh gives minimal latency, minimal cost and minimal complexity for a small system. A larger system can have a switched network and/or multiple hops between at least some of the sub-modules. Also shown, are links to an external transport network. In this example, two of the network node sub-modules also acts as gateway units, but these could be separate units.

However, with the circuits for processing becoming smaller, they may be integrated on the backside of the antenna, as schematically illustrated in FIG. 11.

FIG. 11 is a schematic diagram illustrating still another particular example of a clustered radio access network node according to an embodiment. In this example, the cluster of interconnected network node sub-modules 210 may be physically distributed. For example, the radio and/or antenna units 220 of the radio access network node 200 may be distributed and each network node sub-module 210 may be "integrated" physically with the corresponding radio and/or antenna unit 220. This solution represents a more autonomous solution, where each aggregation of network node sub-module and radio/antenna unit includes the entire chain of digital baseband processing, radio frequency processing, power amplification and antenna elements. However, it should be understood that the entire set of network node sub-modules is required to handle the service set of a radio access network node.

A tight connection between digital processing and antenna allows for optimally designing these together for supporting high integration and performance.

In other words, the proposed technology relates to a radio access network node implemented as a distributed system, a scalable cluster of members or units, also referred to as network node sub-modules, at least one of which is managing cells or sectors, i.e. one or a few antennas. The cluster communication between these may be based on a communication mechanism where at least one sub-module can directly do a write operation into a data structure located in the memory of at least one other sub-module.

By way of example, the memory structure may be arranged with separate areas for each cluster member, allowing for efficiently aggregating shared protocol and state information.

Together these mechanisms enable a real-time cluster implementation within the radio base station with latencies in micro-second range. This also gives scalability and high availability.

In a sense, the proposed technology opens up for applying the "cloud" paradigm also to the radio aspects. For example, the proposed technology enables a radio access network node such as a base station to be configured as a cluster of members/cells that cooperate for optimizing the use of the radio resources of each member/cell. The cluster protocol also allows for a tight cooperation where information may be shared and replicated between members.

Examples of one or more advantages and/or technical effects that may be achieved by the proposed technology:
- Easy to scale up and/or scale down—some cluster members can be in "coverage" mode and always on, while others power up and integrate when needed. This brings in more radio capacity but also brings in more processing capacity into the cluster when desired.
- Managing power efficiency becomes very simple and very efficient, e.g. scales linearly down to what is needed for "coverage".
- High availability—cluster middleware supports replication of critical data in two or more places within the cluster, avoiding single point of failures and downtime as well as ensuring graceful degradation.
- Cluster members may be optimized for best efficiency, e.g. with respect to cost, power and so forth, avoiding driving cost and risk with leading edge technology.
- Having replicated information available locally in each sub-module relaxes real time requirements, avoiding high cost leading edge solutions.

The very high performance of the cluster protocol allows for a distributed implementation of functionality in areas where solutions of today have resorted to centralized implementations to make optimizations within the time of radio delays and within the Transmission Time Interval (TTI). The speed of the proposed solution allows for scalable clustered implementations throughout the protocol stacks.

In a particular example, there is provided a radio access network node built of distributed units with mechanisms for enabling at least some of the benefits above:
- A low latency and low overhead communication mechanism within the cluster
- A very low latency and low overhead aggregation mechanism within each unit, aggregating data from the other units
- A cluster interconnect with well-defined properties, specifically low latency.

The proposed technology may thus provide for short delays allowing baseband, data plane and/or control processing to be implemented as cluster, giving one or more of the advantages previously outlined.

Figure 12:
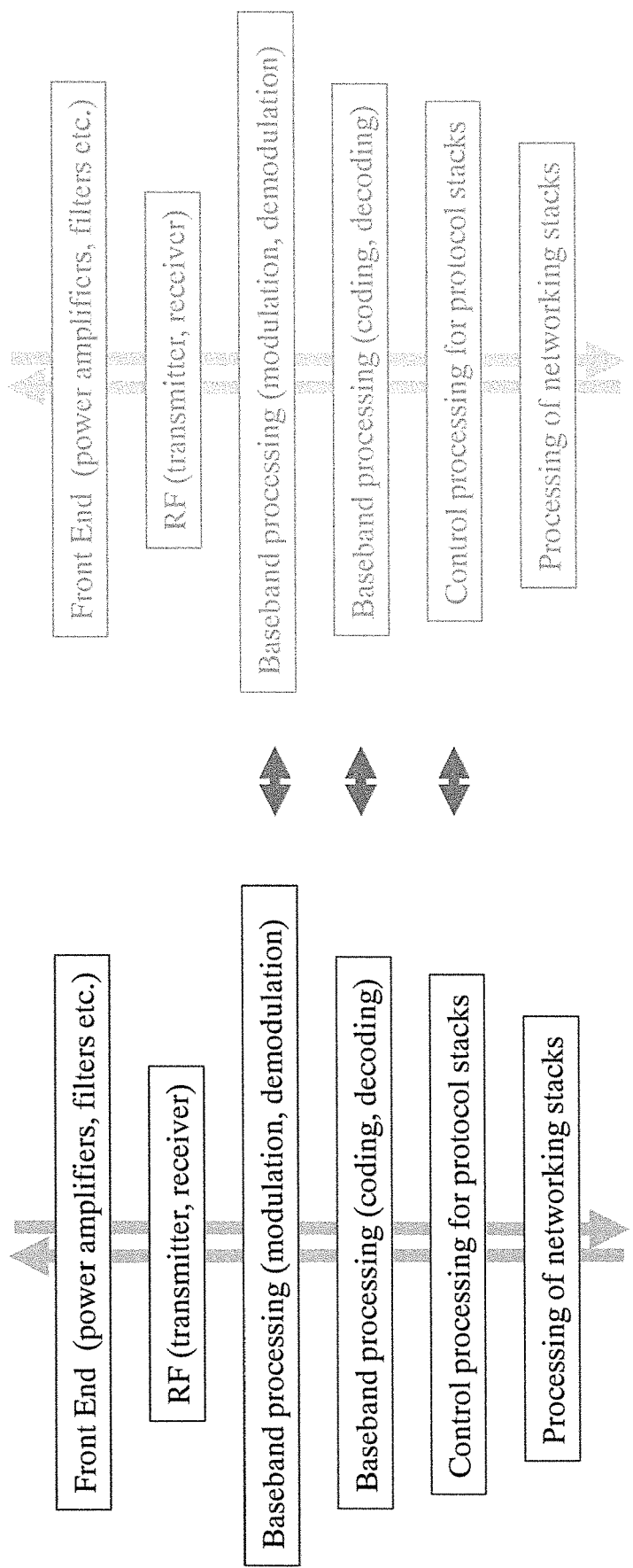
FIG. 12 is a schematic diagram illustrating an example of the structure of radio control processing in a cluster implementation.

FIG. 12 is a schematic diagram illustrating an example of the structure of radio control processing in a cluster implementation. Layers related to baseband processing and/or control processing need coordination between cluster members for maximizing the efficiency of the radio spectrum.

The method for communication should be applicable to different functions in these radio protocol stacks. The input information flow that the radio protocols react on depends on TTI and round trip delays.

Preferably, the proposed technology enables distributed data replication, event ordering, distributed agreements and so forth within a very short timescale similar to radio TTI and roundtrip delays.

Figure 13:
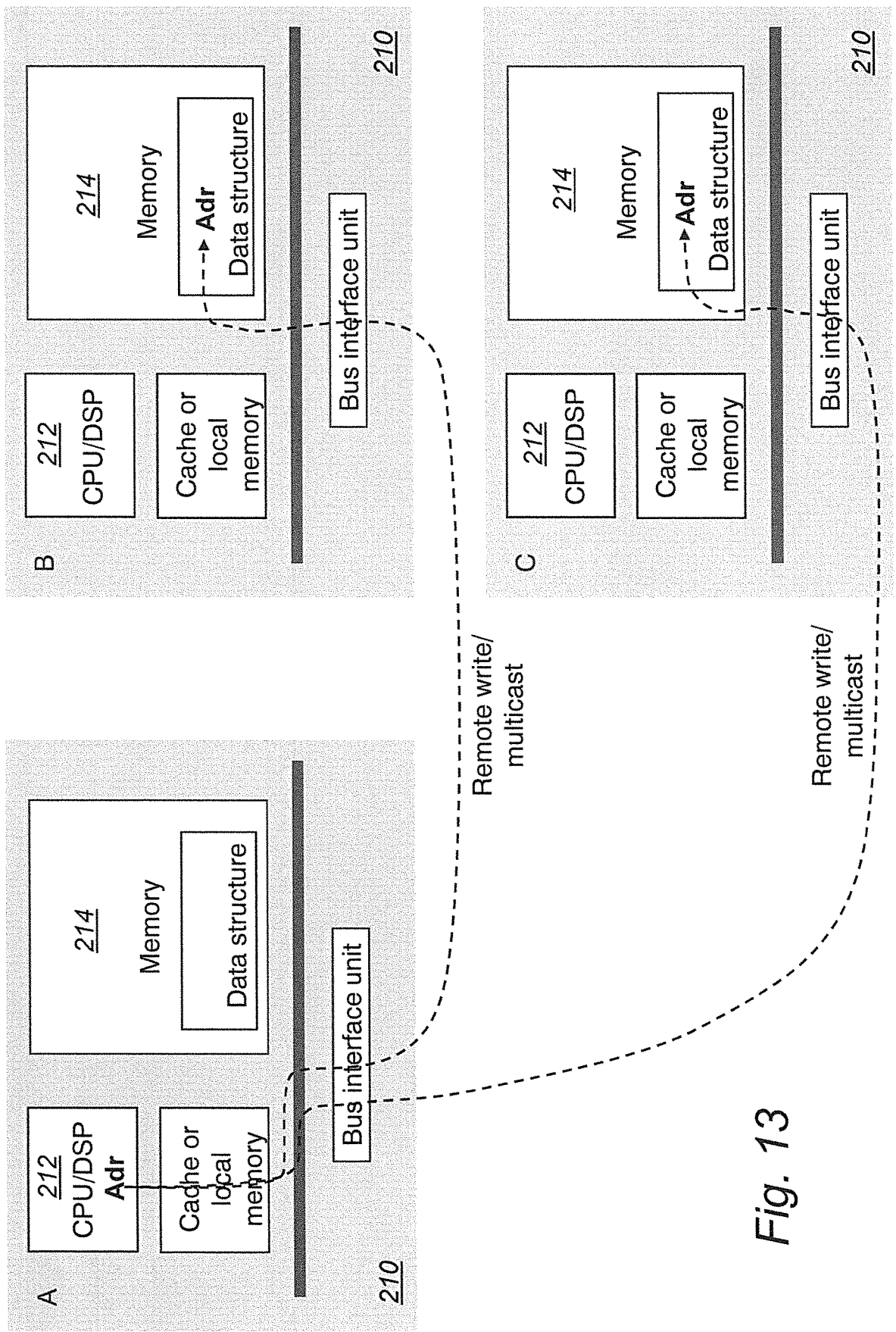
FIG. 13 is a schematic diagram illustrating an example of a cluster of network node sub-modules, where at least one of the network node sub-modules is configured to perform a remote write and/or multicast of data into the data structure of one or more other network node sub-modules.

FIG. 13 is a schematic diagram illustrating an example of a cluster of network node sub-modules, where at least one of the network node sub-modules such as sub-module A is configured to perform a remote write and/or multicast of data into the data structure of one or more other network node sub-modules such as sub-modules B and C.

In this example, network node sub-module A performs a remote write operation into a data structure in the memory of sub-module B and/or sub-module C. The low latency operation and the high efficiency comes from the sub-module directly addressing the location in the data structure of the memory of the other sub-module where data is going to be placed.

An additional optional optimization can be that the hardware in the receiving sub-module is set up to also copy-write to the cache of the receiving processor, sometimes referred to as cache stashing or direct cache access (DCA), or to write directly to the local memory of the processor core. This is beneficial in cases where there is a dedicated core for the specific processing when receiving a write, e.g. it is known in advance which core that will be processing and not load balanced.

By way of example, the underlying hardware for implementing the sub-modules can be connected using PCIexpress, e.g. through a PCIexpress non-transparent bridge. This specifically enables the possibility to have the data structure directly within user space of the receiver, where updates from PCI express can still be done without requiring OS or hypervisor intervention, causing interrupts, Virtual Machine (VM) exits and so forth. A non-transparent bridge provides basic fault isolation, i.e. a fault in sub-module B cannot cause sub-module A to hang. This is not necessary for providing scalability but for achieving high availability and resilience at hardware and/or software faults.

PCIexpress is very low latency and also low cost, but has limited scalability. PCIe systems can typically include a few units, or a few tenths of units when using a switch.

Another alternative implementation can be based on Remote Direct Memory Access (RDMA) and/or RDMA over Converged Ethernet (RoCE), which is a network protocol that allows RDMA over an Ethernet network. This is supported by high-end network adapters for Infiniband or converged Ethernet. These solutions are highly scalable (thousands of nodes) but also very costly.

Figure 14:
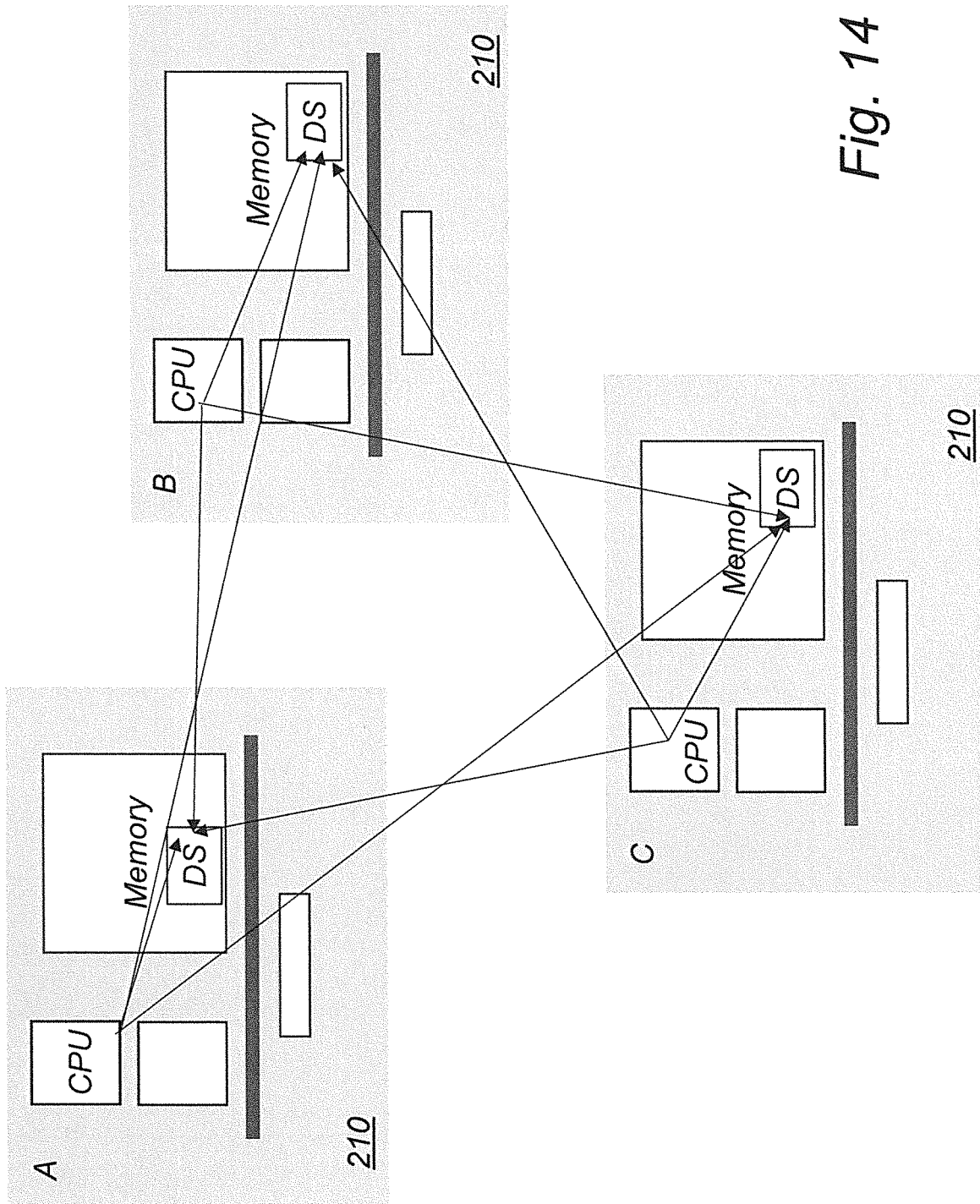
FIG. 14 is a schematic diagram illustrating an example of a cluster of network node sub-modules, where each of the network node sub-modules is configured to share data to one or more of the other network node sub-modules.

FIG. 14 is a schematic diagram illustrating an example of a cluster of network node sub-modules, where each of the network node sub-modules is configured to share data to one or more of the other network node sub-modules.

Cluster protocols allows for processors to collaborate and work on a shared problem. Even if not all data is shared, the cluster protocol may provide mechanisms at least for sharing some data and agreements on what to do and when. For example, this may be done by using remote writes to replicate the same shared data in one copy for each participant. A member updating data updates their own data structure and replicate that update using remote write (or a remote broadcast) to all member's data structures. An example of a suitable cluster protocol that may be configured to work according to these principles is Derecho.

Example Flow for Simple Message Transfer

After an initiation phase it is possible to have access to shared memory areas and to use transfer methods that are similar to shared memory communication within a single processor. Preferably, the protocols are customized and restricted to use remote writes and local reads (since remote reads have long latency and are typically avoided). For example, the protocol may use so-called producer/consumer patterns, e.g. only producer updates messages and end-pointer, only receiver reads messages and updates start pointer.

Initialization—Once at Start/Setup
    Set up physical connection—if not already done for another communication
    Device Discovery
    Addressing
    Security/encryption
    Set up service/protocol
        Service discovery
            Negotiate protocol version, data representation
        Set up communication memory areas, typically includes
            A larger area for variable sized message data transfer
            A smaller area for fixed sized state transfer, e.g. queue start & end positions
        Exchange area addresses Communicate (for each message)
    Transmitter create and transfer message, appending to end of queue (if multiple receivers then multicast write to each receiver)
    Reads start pointer to verify free space in area.
    Remote write message to receiver data transfer area
    Remote write receive buffer end-pointer to inform receiver that new message arrived
        (optional) write to magic address to generate interrupt o wake up receiver
    (each) receiver polls end-pointer and discovers non-empty message queue
    Reads and verifies message
    Handles message
    Updates queue start pointer and remote writes to sender for acknowledging transfer and to indicate area as freed Example Flow for Simple Negotiation After the initiation phase an optional negotiation may follow the steps of shared memory communication with the exception that information sharing is restricted to pure producer/consumer patterns, e.g. only producer updates messages and end-pointer, only receiver reads messages and updates start pointer.

An example of negotiation is an election protocol, used for example to elect one member/sub-module to perform a leader role. Other examples are quorum votes or Paxos protocols.

Initialization (once at setup)
    «as above»
Negotiate (for each round of negotiation)
    A unit initiate by multicasting a request to other units
        Request includes information on what negotiation (e.g. a leader election) and what area to respond in
    Units respond by writing their response
        Each unit reply in the their private response area (e.g. their capability to be the leader)
    The requester iterate over the responses and informs the leader
        Requester sends a message to the elected leader
    The leader informs all units that it is the leader for the function.

Here, "capability to be leader" can for example involve a capability (or priority) indication concatenated with the unique ID of the member/sub-module. The member with the highest number will then be elected. If a member sees a request for election without seeing a later information on elected leader, then it can reissue another request.

FIG. 15 is a schematic diagram illustrating an example of the data structure within the memory of a network node sub-module, with separate areas for each member/participant sharing information.

In this example, the data structure includes separate areas for each participant sharing information. A regular structure allows a user sharing information to iterate by addressing using a fixed offset. This allows for prefetching data in advance (either hardware or software prefetching). Data is typically aligned to cache-line size to avoid unnecessary cache transfers. Updates are then done with cache-line sized write operations suing a processors vector instruction set.

Figure 16:
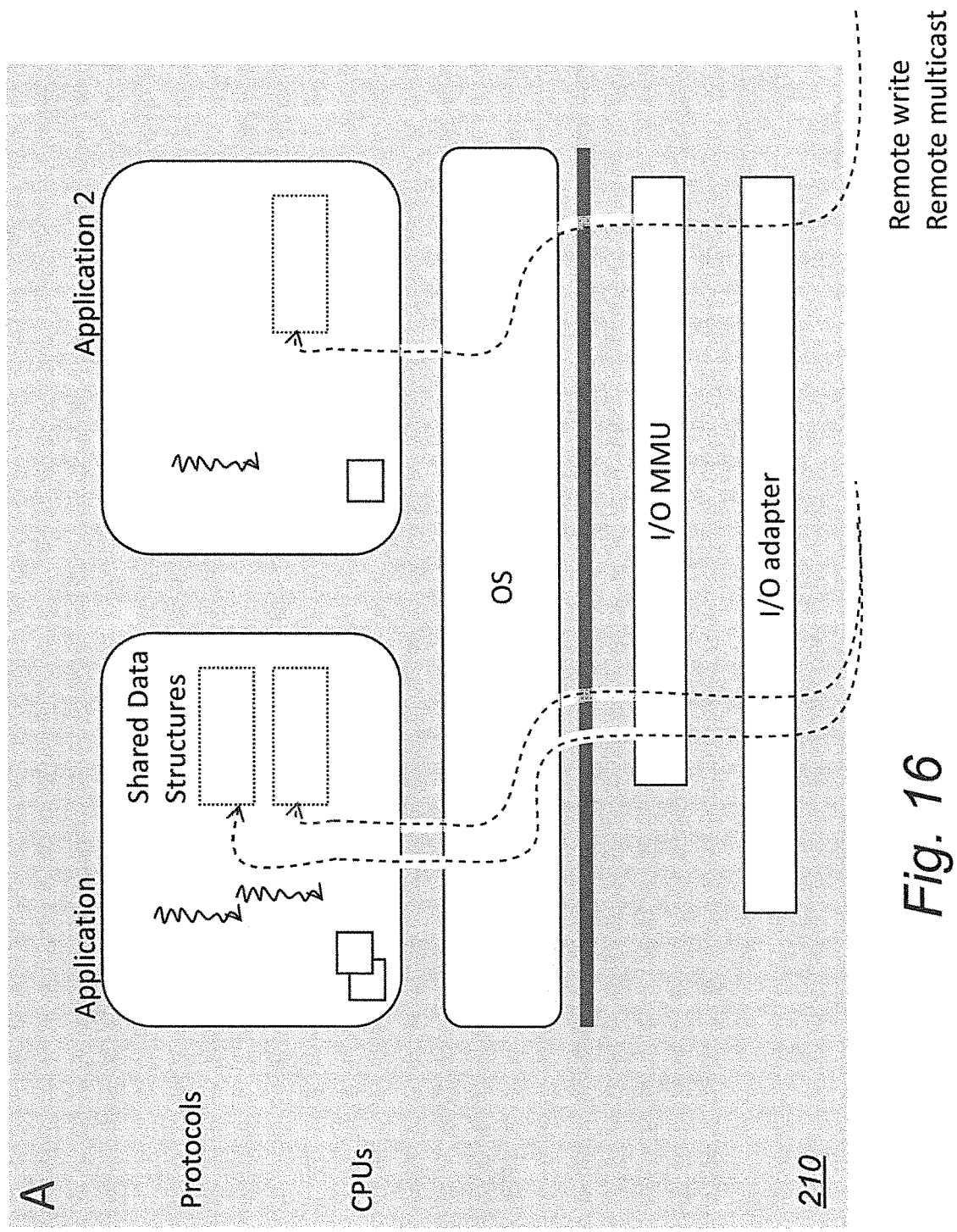
FIG. 16 is a schematic diagram illustrating an example of an implementation of a network node sub-module according to an embodiment.
Figure 17:
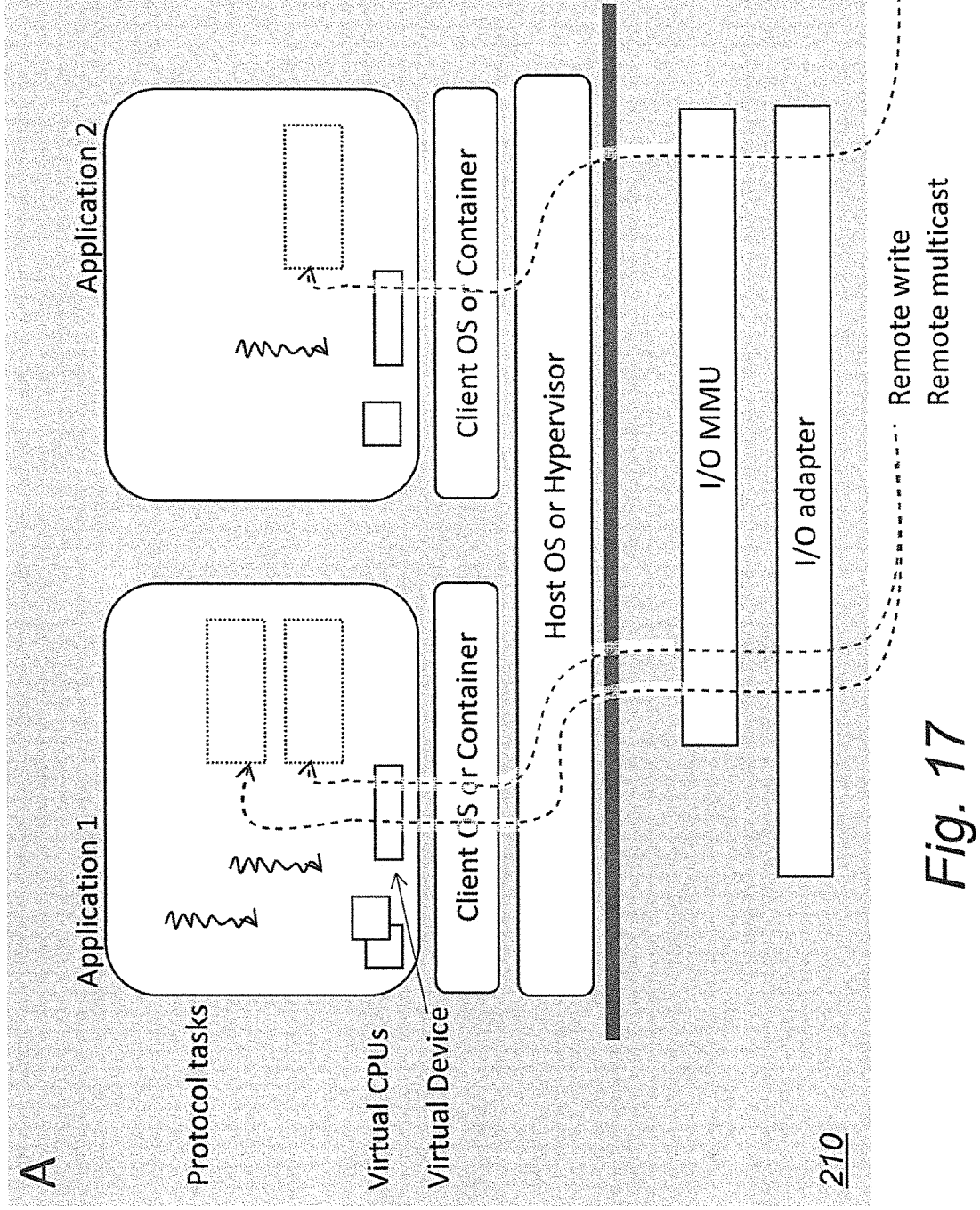
FIG. 17 is a schematic diagram illustrating another example of an implementation of a network node sub-module according to an embodiment.

By way of example, the remote write can be implemented both in native and virtualized processing environments. FIG. 16 gives an example of a more detailed illustration of a native implementation and FIG. 17 gives an example of a more detailed illustration of a virtualized implementation.

FIG. 16 is a schematic diagram illustrating an example of an implementation of a network node sub-module according to an embodiment.

A network node sub-module can have multiple programs or software modules implementing different functions. Each of these can set up one or multiple shared memory areas for separately sharing of different data and/or protocol state with the corresponding functionality in other sub-modules.

The mapping between programs and data implementing a function and which sub-modules they execute on can be fixed or defined by configuration, or negotiated at setup when functionality is initialized.

The use of multiple areas allows for protocols and shared data areas to be individually set up and operated independently as well as independently developed and managed.

An Input-Output Memory Management Unit (IOMMU), sometimes referred to as SMMU or for Intel as VT-d, enables individual mapping and protection of shared areas down to page level (typically 4 kbyte or 16 kbyte pages). This enables direct remote writes into shared areas in the application memory. An IOMMU can be seen as a memory management unit that connects a direct-memory-access-capable (DMA-capable) I/O bus to the main memory.

The organization of multiple shared data areas allow for areas related to state information concerning the implementation of cluster protocols. For example, one area may include state information related to a multicast protocol where each receiver updates status information indicating successful reception. With all receptions indicated in a given pattern the sender can quickly iterate over replies from all involved sub-modules.

Other areas can instead be organized to support fast and direct sharing of state information in the radio base application itself. For example, the radio application handling protocol for packet transmission can use direct writes to the data structures of other sub-modules for updating each of them regarding output scheduling states.

FIG. 17 is a schematic diagram illustrating another example of an implementation of a network node sub-module according to an embodiment.

Virtualization means that programs execute on a virtual (rather than native) machine/computer. There are several possible implementations using Virtual Machines (VMs), e.g. VMs executing client operating system or Containers.

One way of utilizing virtualization is to have an individual virtualized environment for each application program as shown but it is also possible to execute multiple programs within one virtualized environment. Independently, the IOMMU allows for individual mapping and protection of shared areas down to page granularity.

The virtualization support can then include virtualized I/O devices that can be mapped into the application, allowing direct memory writes to bypass client and host OS enabling high bandwidth and low latency.

A common standard for creating virtual I/O devices is Single-Root Input-Output Virtualization (SR-IOV) that allows for a physical PCIexpress device to be shared in virtualized environment by offering multiple virtualized resources that can be made available directly to the application program.

The remote write mechanism allows any organization of the memory data, for example per protocol or per sub-module as described below.

Figure 18:
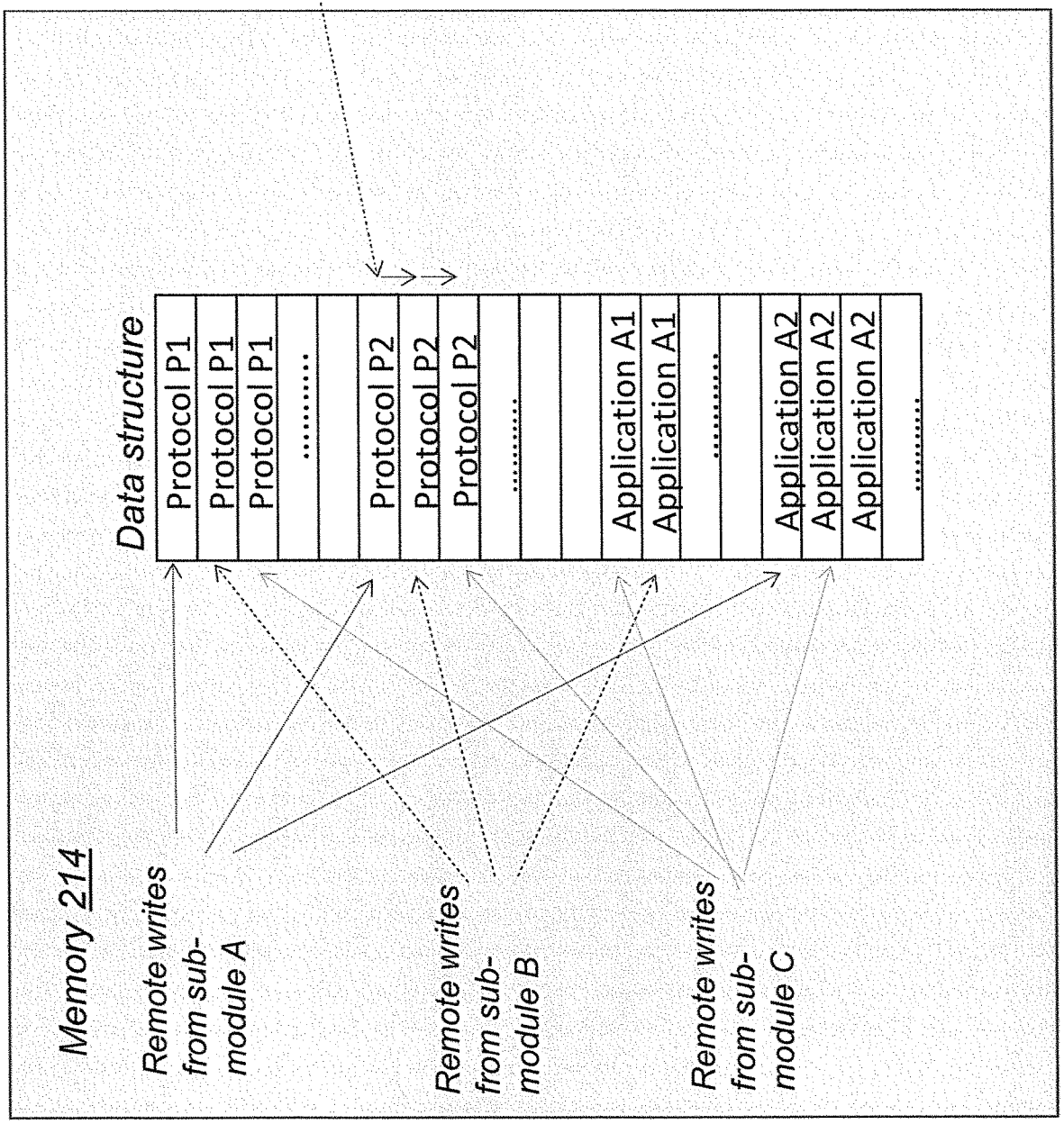
FIG. 18 is a schematic diagram illustrating an example of a data structure organized per protocol according to an embodiment.

FIG. 18 is a schematic diagram illustrating an example of a data structure organized per protocol according to an embodiment. In this example, the data structure is based on an organization where data areas for receiving information from different sub-modules are allocated consecutively in memory. Remote writes from one sub-module will then be to different areas depending on application and protocol.

Alternatively, the data structure can be organized with areas written by each sub-module allocated consecutively in the address space.

Figure 19:
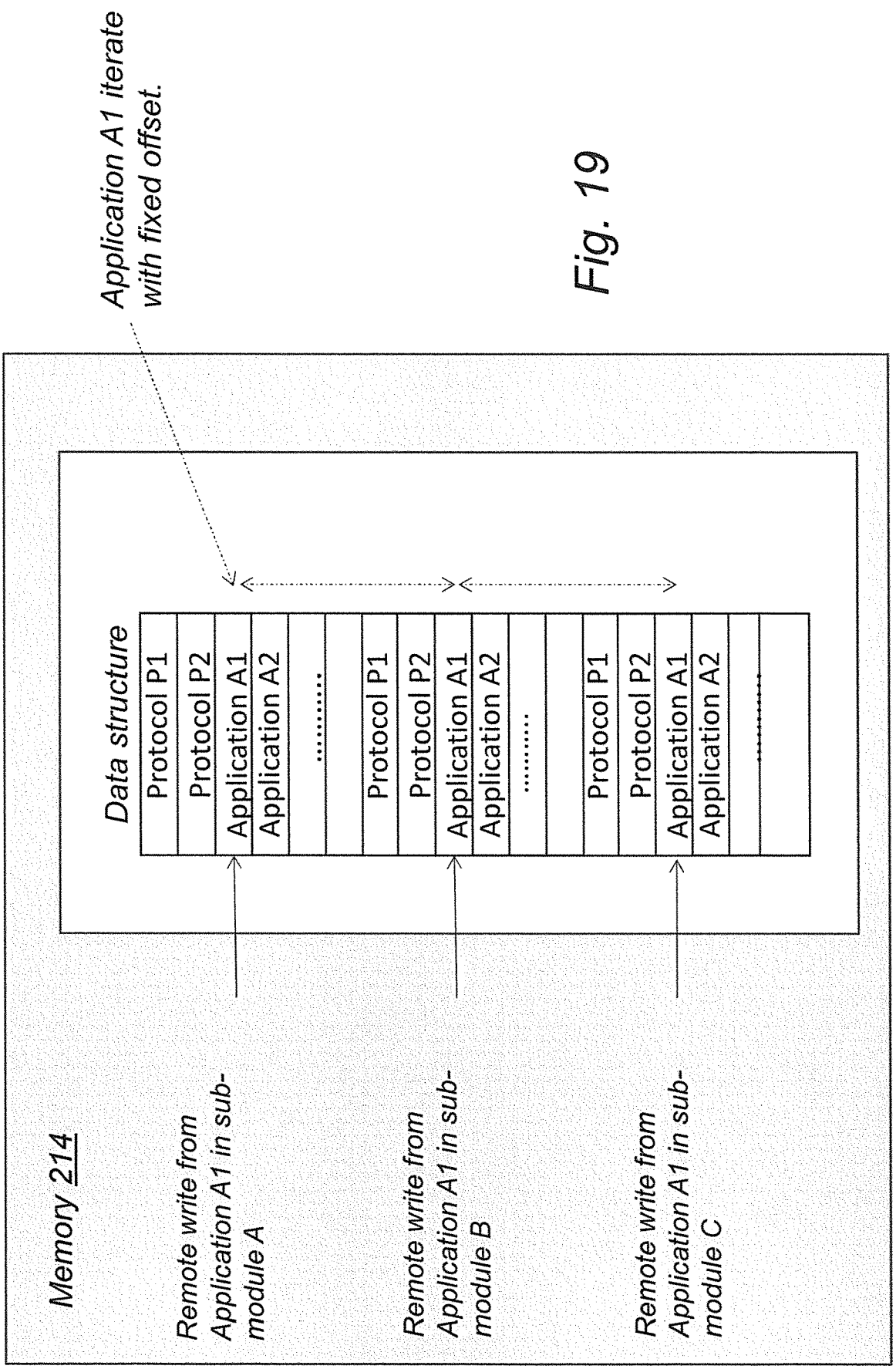
FIG. 19 is a schematic diagram illustrating an example of a data structure organized per sub-module according to an embodiment.

FIG. 19 is a schematic diagram illustrating an example of a data structure organized per sub-module according to an embodiment. In this example, the organization of the data structure may allow for improved memory protection against erroneous accesses in many processor implementations as described below. For example, processor MMU and IOMMU can be set together to protect areas, allowing updates only from remote write operations from other sub-modules. Also, mapping can optionally be configured to allow for a sub-module to only perform writes to its designating memory areas in other sub-modules, FIG. 20 is a schematic diagram illustrating an example of a data structure and write protected memory when accessing and/or iterating received information within the memory of a sub-module, with separate page areas for each sub-module/participant sharing information.

Figure 21:
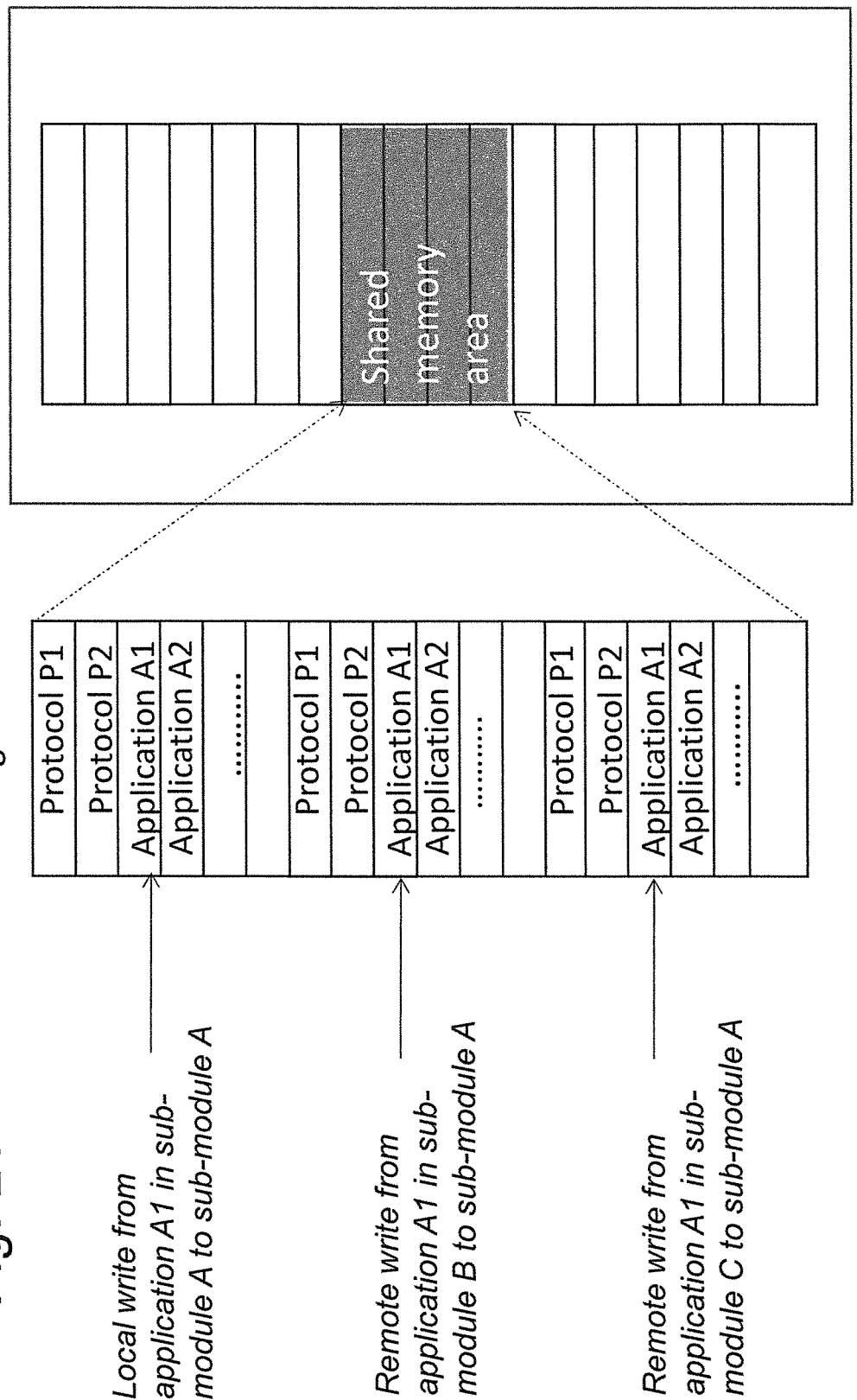
FIG. 21 is a schematic diagram illustrating yet another example of a data structure according to an embodiment.

FIG. 21 is a schematic diagram illustrating an example of the read protected data structure for performing remote write within the address space of a sub-module, with separate areas for each sub-module/participant sharing information.

Figure 22:
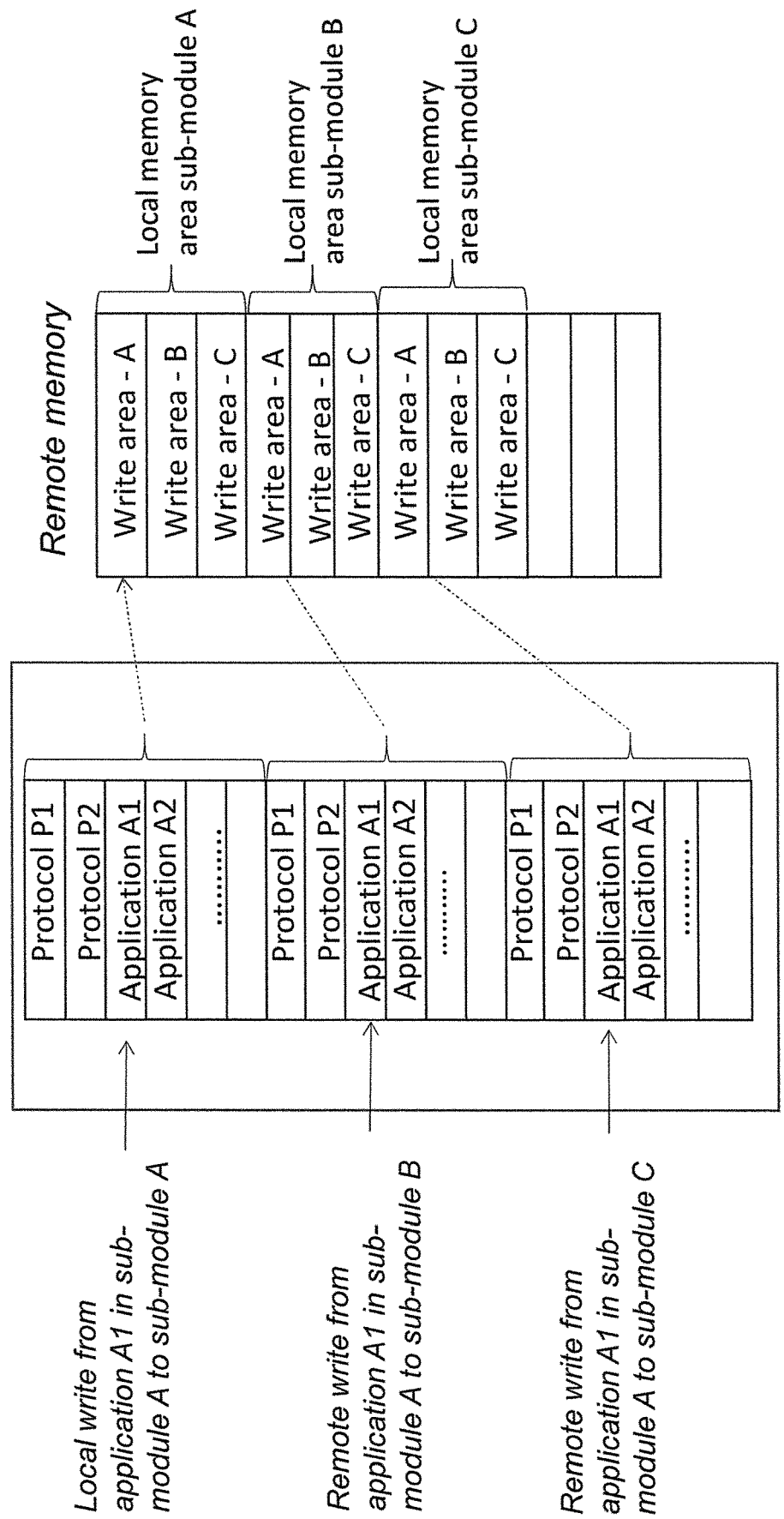
FIG. 22 is a schematic diagram illustrating still another example of a data structure according to an embodiment.

FIG. 22 is a schematic diagram illustrating an example of the read and write protected data structure for performing remote write within a sub-module, with separate read and write protected areas, for each sub-module/participant sharing information.

Figure 20:
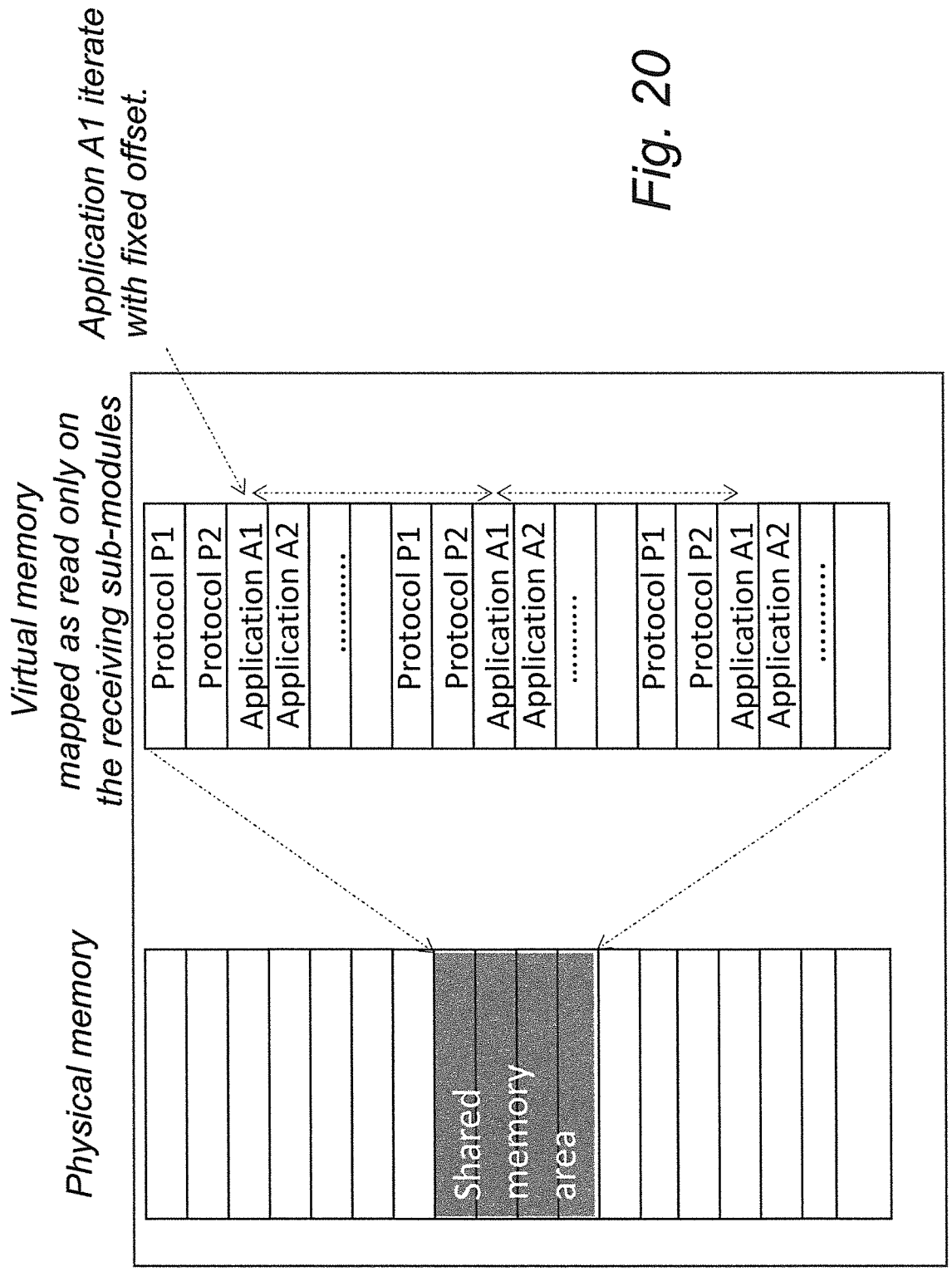
FIG. 20 is a schematic diagram illustrating another example of a data structure according to an embodiment.

To protect the receiving program (which iterates through the data structure) write in the dedicated area shown in FIG. 19, the virtual memory is mapped as read only, as illustrated in FIG. 20. The sending side map the virtual memory in FIG. 19 as write only, as illustrated in FIG. 21.

To protect sending sub-modules performing remote writes from doing erroneous writes in wrong memory area shown in FIG. 19, only the memory which is allocated for the sub-module is mapped into the virtual address space, as illustrated in FIG. 22.

Figure 23:
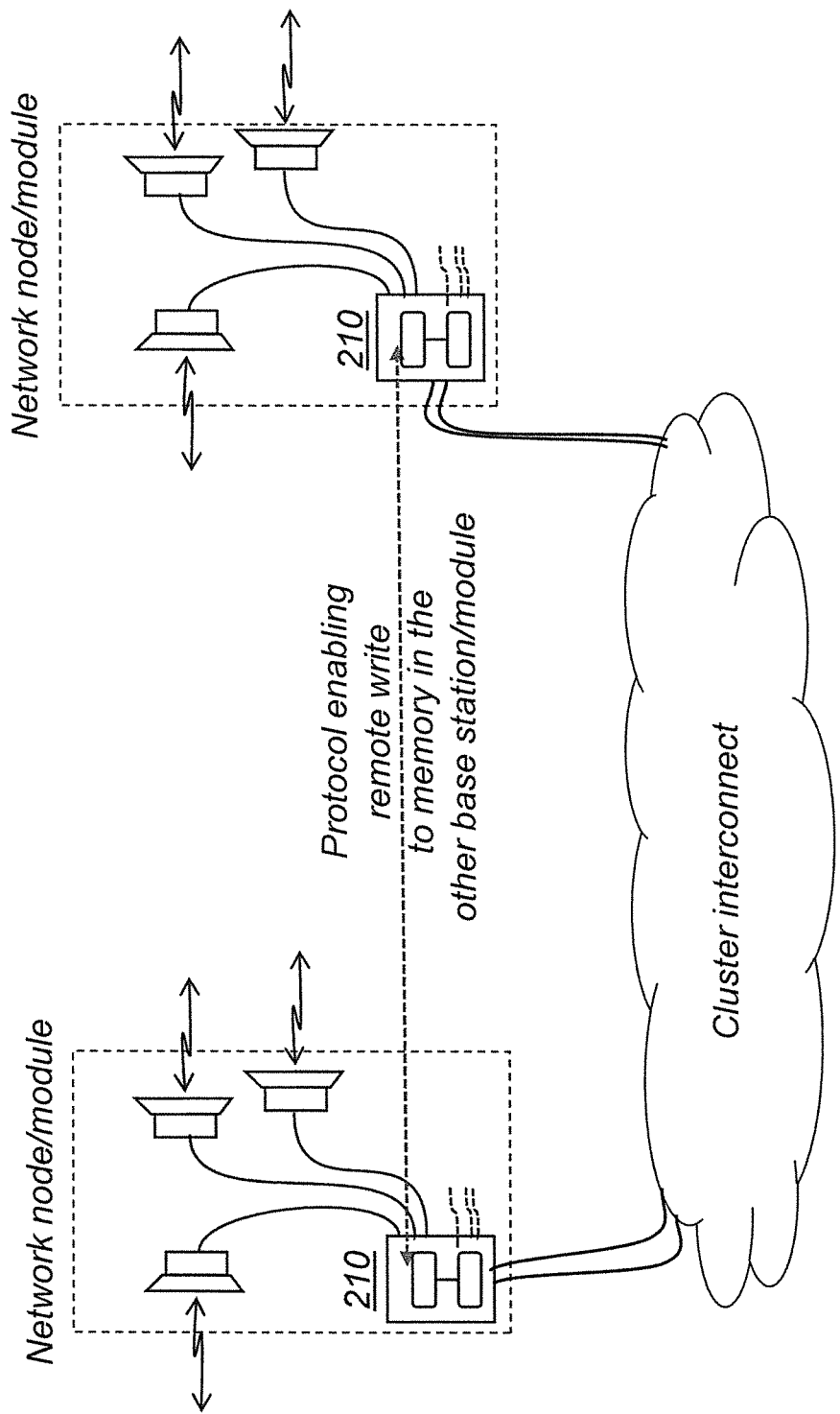
FIG. 23 is a schematic diagram illustrating an example of a cluster of radio access network nodes and/or network node sub-modules interconnected by means of a "cloud-based" cluster interconnect.

FIG. 23 is a schematic diagram illustrating an example of a cluster of radio access network nodes and/or network node sub-modules interconnected by means of a "cloud-based" cluster interconnect. However, with longer distances and more complex interconnect it will not, be possible to reach the same low latencies, but still much lower than conventional protocols. With longer latencies, it gets even more import to replicate data within the cluster. The proposed technology allows for keeping local copies consistent and updated, avoiding roundtrip delays.

Figure 24:
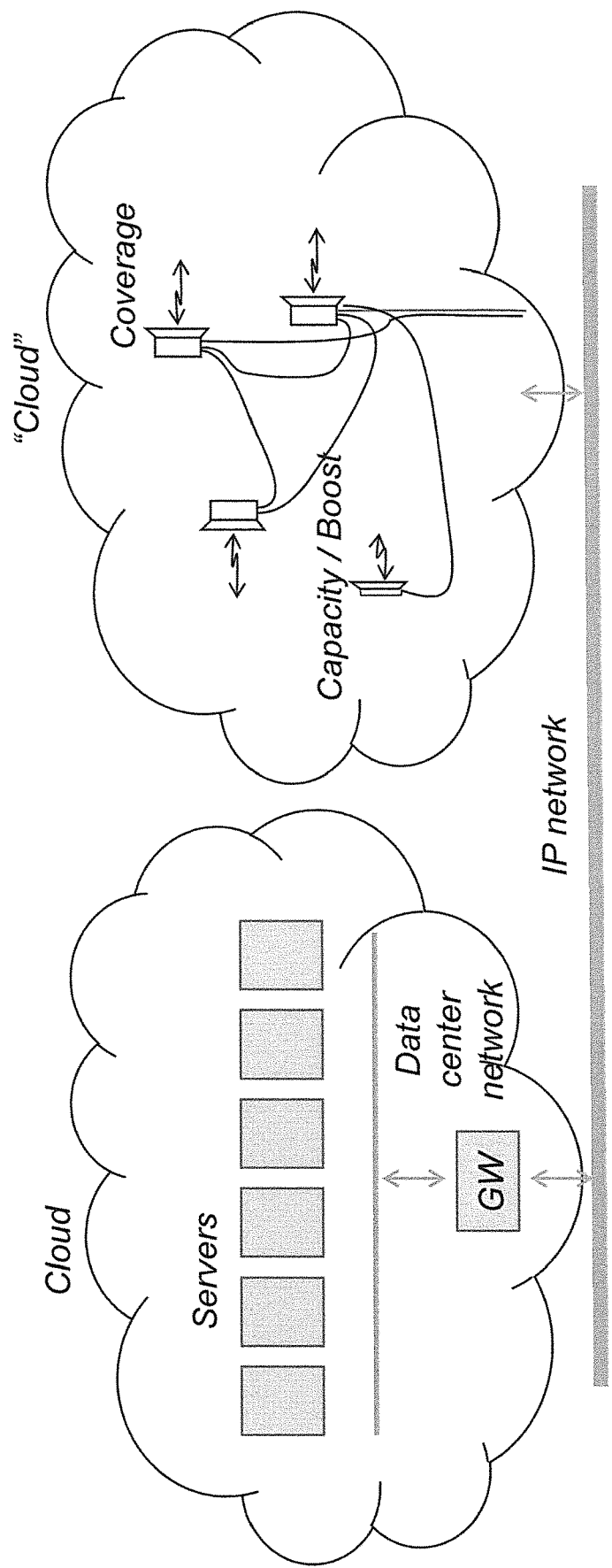
FIG. 24 is a schematic diagram illustrating a comparative example of an execution cloud and a radio protocol cloud.

FIG. 24 is a schematic diagram illustrating a comparative example of an execution cloud and a radio protocol cloud.

A current trend in Radio Access Network (RAN) development is to move functionality to datacenters in the cloud for achieving resilience, scalability, ease of maintenance and so forth. The key enabler for this is that the software is designed as a scalable distributed application.

The proposed technology allows for implementing scalable and distributed applications also near the radio, potentially enabling a similar cloud view also locally in the low latency radio protocol part of the system. For latency reasons, this execution should preferably, although not necessarily, be physically near the radio antennas. In the very best case these are integrated as one physical unit.

By having a distributed application also at the real-time execution in the radio access network node, it is possible to reuse mechanisms from the cloud for software maintenance and lifecycle issues, giving the same manageability. Also, a so-called local cloud view in the radio access network node with distributed independent sub-modules that can fail or restart without bringing the whole radio access network node down will also support a higher availability.

It will be appreciated that the methods and arrangements described herein can be implemented, combined and re-arranged in a variety of ways.

For example, embodiments may be implemented in hardware, or in software for execution by suitable processing circuitry, or a combination thereof.

The steps, functions, procedures, modules and/or blocks described herein may be implemented, in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

FIG. 25 is a schematic diagram illustrating an example of a computer implementation 300 according to an embodiment. In this particular example, at least some of the steps, functions, procedures, modules and/or blocks described herein are implemented in a computer program 325; 335, which is loaded into the memory 320 for execution by processing circuitry including one or more processors 310. The processor(s) 310 and memory 320 are interconnected to each other to enable normal software execution. An optional input/output device 340 may also be interconnected to the processor(s) 310 and/or the memory 320 to enable input and/or output of relevant data such as input parameter(s) and/or resulting output parameter(s).

It is also possible to provide a solution based on a combination of hardware and software. The actual hardware-software partitioning can be decided by a system designer based on a number of factors including processing speed, cost of implementation and other requirements.

The term 'processor' should be interpreted in a general sense as any system or device capable of executing program code or computer program instructions to perform a particular processing, determining or computing task.

The processing circuitry including one or more processors 310 is thus configured to perform, when executing the computer program 325, well-defined processing tasks such as those described herein.

In a particular aspect, there is provided a computer program 325; 335 for operating, when executed, a radio access network node for a wireless communication system. The radio access network node is implemented as a clustered system comprising a cluster of at least two interconnected network node sub-modules. The computer program 325; 335 comprises instructions, which when executed by at least one processor, cause the at, least one processor to:
 enable at least one of the network node sub-modules to manage at least one radio and/or antenna unit, and
 enable at least one of the network node sub-modules to perform a direct memory write operation into a data structure of at least one other network node sub-module.

By way of example, the computer program 325; 335 may be implemented as a distributed application for execution on the cluster of interconnected network node sub-modules.

In another particular aspect, there is provided a computer program 325; 335 for operating, when executed, a network node sub-module of a clustered radio access network node comprising a cluster of at least two interconnected network node sub-modules. The computer program 325; 335 comprises instructions, which when executed by at least one processor 310, cause the at least one processor to:
 enable the network node sub-module to manage at least one radio and/or antenna unit, and
 enable the network node sub-module to perform a direct memory write operation into a data structure of at least one other network node sub-module.

The processing circuitry does not have to be dedicated to only execute the above-described steps, functions, procedure and/or blocks, but may also execute other tasks.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

By way of example, the software or computer program 325; 335 may be realized as a computer program product, which is normally carried or stored on a computer-readable medium 320; 330, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

The flow diagram or diagrams presented herein may be regarded as a computer flow diagram or diagrams, when performed by one or more processors. A corresponding apparatus may be defined as a group of function modules, where each step performed by the processor corresponds to a function module. In this case, the function modules are implemented as a computer program running, on the processor.

The computer program residing in memory may thus be organized as appropriate function modules configured to perform, when executed by the processor, at least part of the steps and/or tasks described herein.

FIG. 26 is a schematic diagram illustrating an example of an apparatus for operating, when executed, a radio access network node for a wireless communication system. The radio access network node is implemented as a clustered system comprising a cluster of at least two interconnected network node sub-modules. The apparatus 400 comprises:
 a module 410 for enabling at least one of the network node sub-modules to manage at least one radio and/or antenna unit, and
 a module 420 for enabling at least one of the network node sub-modules to perform a direct memory write operation into a data structure of at least one other network node sub-module.

With reference once again to FIG. 26, there is also provided an apparatus for operating, when executed, a network node sub-module of a clustered radio access network node comprising a cluster of at least two interconnected network node sub-modules. The apparatus 400 comprises:
 a module 410 for enabling the network node sub-module to manage at least one radio and/or antenna unit, and
 a module 420 for enabling the network node sub-module to perform a direct memory write operation into a data structure of at least one other network node sub-module.

Alternatively it is possible to realize the module(s) in FIG. 26 predominantly by hardware modules, or alternatively by hardware, with suitable interconnections between relevant modules. Particular examples include one or more suitably configured digital signal processors and other known electronic circuits, e.g. discrete logic gates interconnected to perform a specialized function, and/or Application Specific Integrated Circuits (ASICs) as previously mentioned. Other examples of usable hardware include input/output (110) circuitry and/or circuitry for receiving and/or sending signals. The extent of software versus hardware is purely implementation selection.

Figure 27:
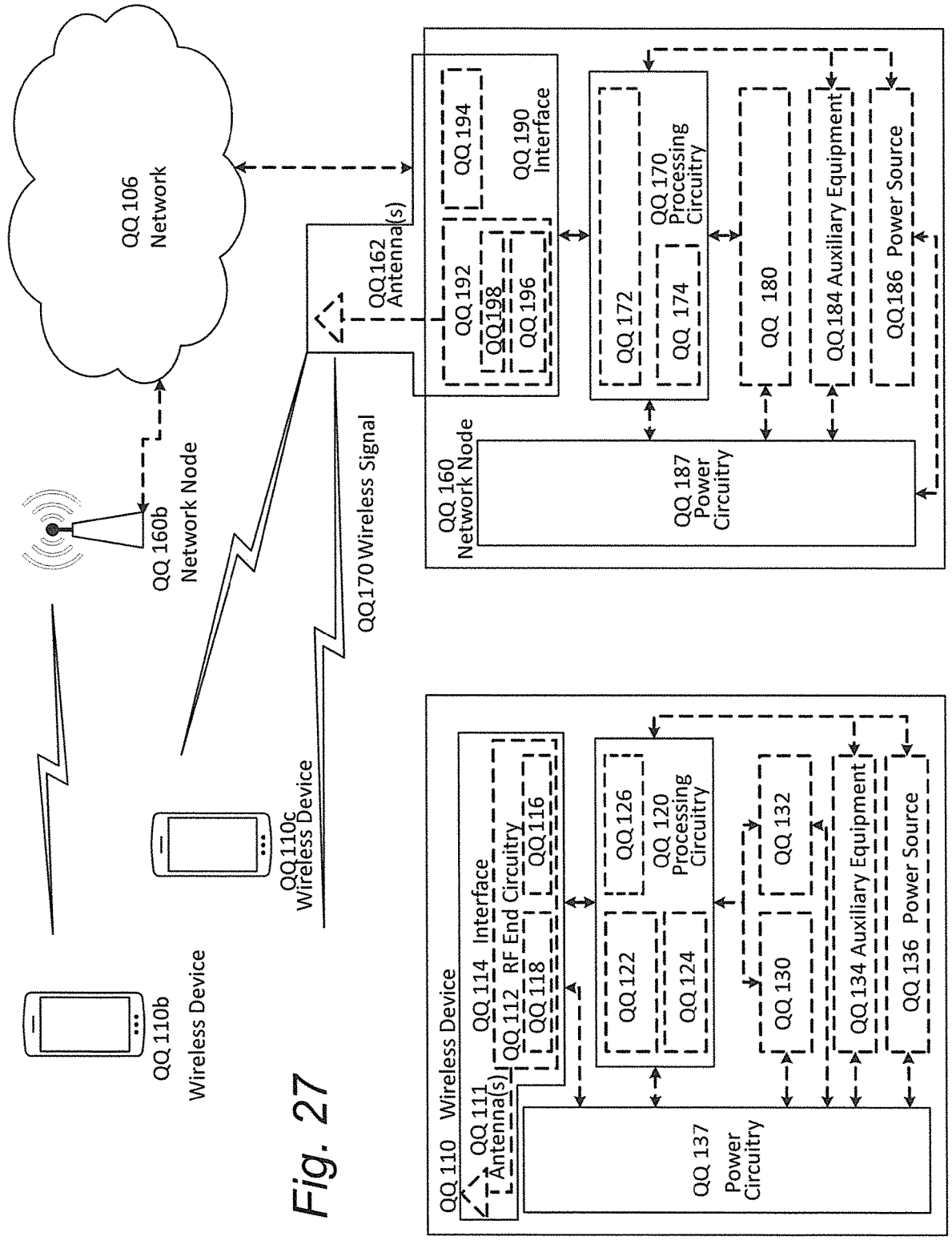
FIG. 27 is a schematic diagram illustrating an example of a wireless network in accordance with some embodiments.

By way of example, the "virtual" apparatus may be implemented in a wireless device or network node (e.g., wireless device QQ110 or network node QQ160 shown in FIG. 27). The apparatus is operable to carry out the example method(s) described herein, e.g. with reference to any of FIGS. 3-7 and possibly any other processes or methods disclosed herein. It is also to be understood that the method(s) of any of FIGS. 3-7 is not necessarily carried out solely by the apparatus in FIG. 26. At least some operations of the method can be performed by one or more other entities.

For example, the virtual apparatus may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types, of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments.

The term module or unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

It is becoming increasingly popular to provide computing services (hardware and/or software) in network devices such as network nodes and/or servers where the resources are delivered as a service to remote locations over a network. By way of example, this means that functionality, as described herein, can be distributed or re-located to one or more separate physical nodes or servers. The functionality may be re-located or distributed to one or more jointly acting physical and/or virtual machines that can be positioned in separate physical node(s), i.e. in the so-called cloud. This is sometimes also referred to as cloud computing, which is a model for enabling ubiquitous on-demand network access to a pool of configurable computing resources such as networks, servers, storage, applications and general or customized services.

There are different forms of virtualization that can be useful in this context, including one or more of:
Consolidation of network functionality into virtualized software running on customized or generic hardware. This is sometimes referred to as network function virtualization.
Co-location of one or more application stacks, including operating system, running on separate hardware onto a single hardware platform. This is sometimes referred to as system virtualization, or platform virtualization.
Co-location of hardware and/or software resources with the objective of using some advanced domain level scheduling and coordination technique to gain increased system resource utilization. This is sometimes referred to as resource virtualization, or centralized and coordinated resource pooling.

Although it may often desirable to centralize functionality in so-called generic data centers, in other scenarios it may in fact be beneficial to distribute functionality over different parts of the network.

A Network Device (ND) may generally be seen as an electronic device being communicatively connected to other electronic devices in the network.

By way of example, the network device may be implemented in hardware, software or a combination thereof. For example, the network device may be a special-purpose network device or a general purpose network device, or a hybrid thereof.

A special-purpose network device may use custom processing circuits and a proprietary operating system (OS), for execution of software to provide one or more of the features or functions disclosed herein.

A general purpose network device may use common off-the-shelf (COTS) processors and a standard OS, for execution of software configured to provide one or more of the features or functions disclosed herein.

By way of example, a special-purpose network device may include hardware comprising processing or computing resource(s), which typically include a set of one or more processors, and physical network interfaces (NIs), which sometimes are called physical ports, as well as non-transitory machine readable storage media having stored thereon software. A physical NI may be seen as hardware in a network device through which a network connection is made, e.g. wirelessly through a wireless network interface controller (WNIC) or through plugging in a cable to a physical port connected to a network interface controller (NIC). During operation, the software may be executed by the hardware to instantiate a set of one or more software instance(s). Each of the software instance(s), and that part of the hardware that executes that software instance, may form a separate virtual network element.

By way of another example, a general purpose network device may for example include hardware comprising a set of one or more processor(s), often COTS processors, and network interface controller(s) (NICs), as well as non-transitory machine readable storage media having stored thereon software. During operation, the processor(s) executes the software to instantiate one or more sets of one or more applications. While one embodiment does not implement virtualization, alternative embodiments may use different forms of virtualization—for example represented by a virtualization layer and software containers. For example, one such alternative embodiment implements operating system-level virtualization, in which case the virtualization layer represents the kernel of an operating system (or a shim executing on a base operating system) that allows for the creation of multiple software containers that may each be used to execute one of a sets of applications. In an example embodiment, each of the software containers (also called virtualization engines, virtual private servers, or jails) is a user space instance (typically a virtual memory space). These user space instances may be separate from each other and separate from the kernel space in which the operating system is executed; the set of applications running in a given user space, unless explicitly allowed, cannot access the memory of the other processes. Another such alternative embodiment implements full virtualization, in which case: 1) the virtualization layer represents a hypervisor (sometimes referred to as a Virtual Machine Monitor (VMM)) or the hypervisor is executed on top of a host operating system; and 2) the software containers each represent a tightly isolated form of software container called a virtual machine that is executed by the hypervisor and may include a guest operating system.

A hypervisor is the software/hardware that is responsible for creating and managing the various virtualized instances and in some cases the actual physical hardware. The hypervisor manages the underlying resources and presents them as virtualized instances. What the hypervisor virtualizes to appear as a single processor may actually comprise multiple separate processors. From the perspective of the operating system, the virtualized instances appear to be actual hardware components.

A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications as well as the virtualization layer and software containers if implemented, are collectively referred to as software instance(s). Each set of applications, corresponding software container if implemented, and that part of the hardware that executes them (be it hardware dedicated to that execution and/or time slices of hardware temporally shared by software containers), forms a separate virtual network element(s).

The virtual network element(s) may perform similar functionality compared to Virtual Network Element(s) (VNEs). This virtualization of the hardware is sometimes referred to as Network Function Virtualization (NFV)). Thus, NFV may be used to consolidate many network equipment types onto industry standard high volume server hardware, physical switches, and physical storage, which could be located in data centers, NDs, and Customer Premise Equipment (CPE). However, different embodiments may implement one or more of the software container(s) differently. For example, while embodiments are illustrated with each software container corresponding to a VNE, alternative embodiments may implement this correspondence or mapping between software container-VNE at a finer granularity level; it should be understood that the techniques described herein with reference to a correspondence of software containers to VNEs also apply to embodiments where such a finer level of granularity is used.

According to yet another embodiment, there is provided a hybrid network device, which includes both custom processing circuitry/proprietary OS and COTS processors/standard OS in a network device, e.g. in a card or circuit board within a network device ND. In certain embodiments of such a hybrid network device, a platform Virtual Machine (VM), such as a VM that implements functionality of a special-purpose network device, could provide for para-virtualization to the hardware present in the hybrid network device.

The proposed technology is generally applicable to provide high performance radio access network nodes such as base stations.

In particular, the proposed technology may be applied to specific applications and communication scenarios including providing various services within wireless networks, including so-called Over-the-Top (OTT) services. For example, the proposed technology enables and/or includes transfer and/or transmission and/or reception of relevant user data and/or control data in wireless communications.

In the following, a set of illustrative non-limiting examples will now be described with reference to FIGS. 20-26.

FIG. 27 is a schematic diagram illustrating an example of a wireless network in accordance with some embodiments.

Although the subject matter described herein may be implemented in any appropriate type of system using any suitable components, the embodiments disclosed herein are described in relation to a wireless network, such as the example wireless network illustrated in FIG. 27. For simplicity, the wireless network of FIG. 27 only depicts network QQ106, network nodes QQ160 and QQ160b, and WDs QQ110, QQ110b, and QQ110c. In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that, may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 27, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 27 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front, end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network, node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 27 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIe) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band Internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal. As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front, end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access. Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 28:
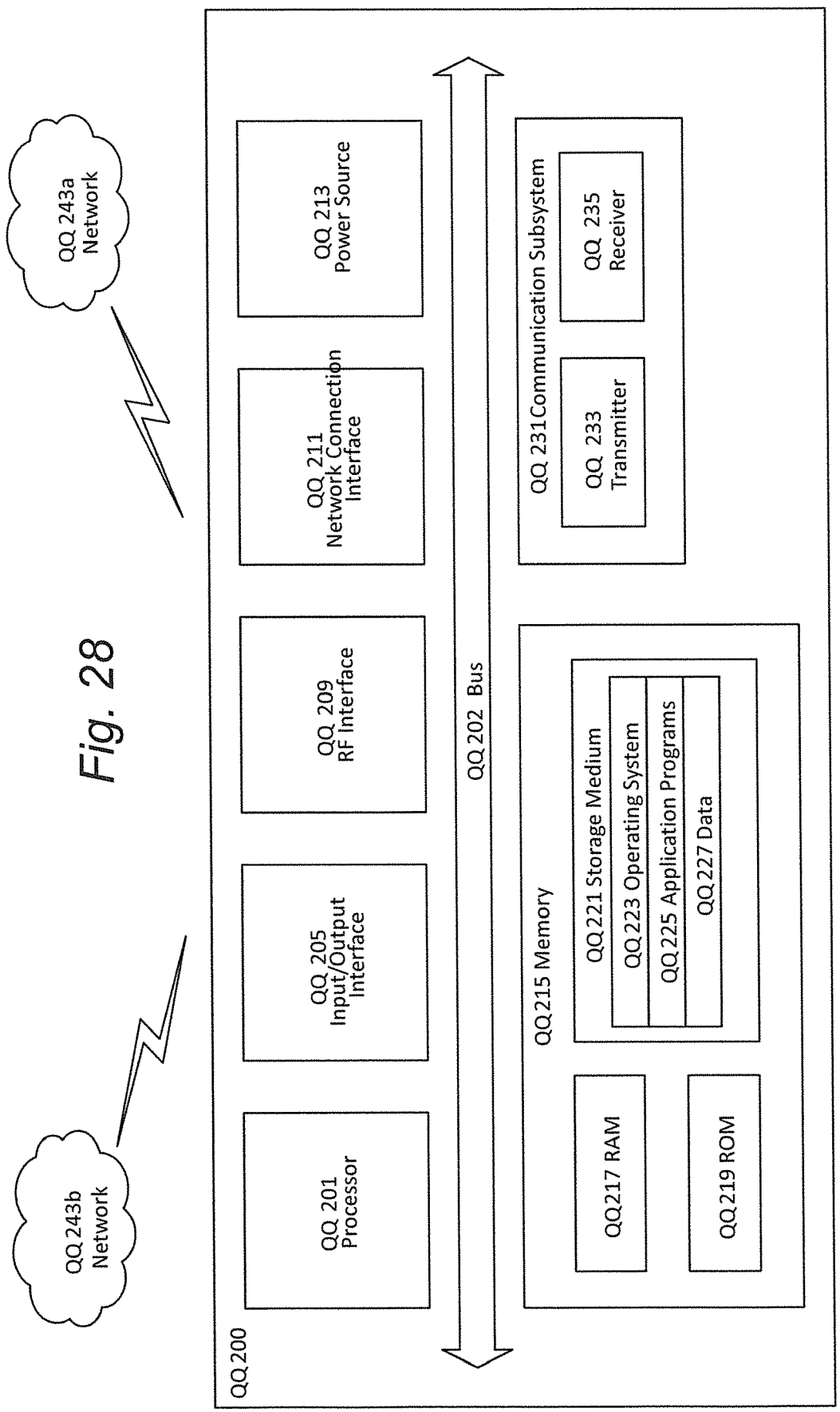
FIG. 28 is a schematic diagram illustrating an example of an embodiment of a UE in accordance with various aspects described herein.

FIG. 28 is a schematic diagram illustrating an example of an embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the $3_{rd}$ Generation Partnership Project (3GPP), including a NB-IoT UE, a machine type communication (MTC) UE, and/or an enhanced MTC (eMTC) UE. UE QQ200, as illustrated in FIG. 28, is one example of a WO configured for communication in accordance with one or more communication standards promulgated by the $3_{rd}$ Generation Partnership Project (3GPP), such as 3GPP's GSM, UMTS, LTE, and/or 5G standards. As mentioned previously, the term WD and UE may be used interchangeable. Accordingly, although FIG. 28 is a UE, the components discussed herein are equally applicable to a WD, and vice-versa.

In FIG. 28, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 28, or only a subset of the components. The level of integration between the components may vary from one UE to another UE. Further, certain UEs may contain multiple instances of a component, such as multiple processors, memories, transceivers, transmitters, receivers, etc.

In FIG. 28, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be, information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 28, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 28, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243b may encompass wired and/or wireless networks such as a local-area network (LAN), a wide-area network (WAN), a computer network, a wireless network, a telecommunications network, another like network or any combination thereof. For example, network QQ243b may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 29:
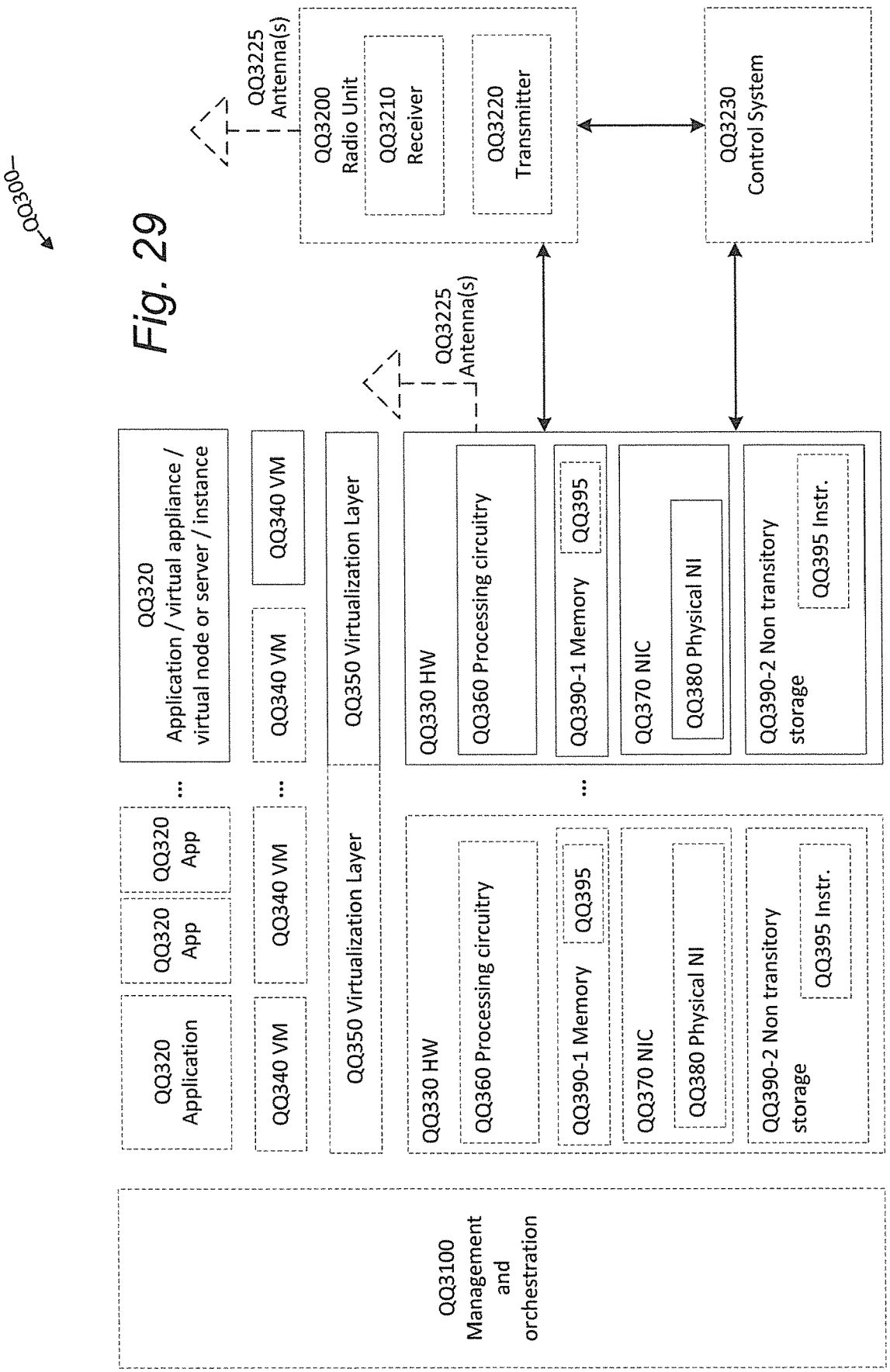
FIG. 29 is a schematic block diagram illustrating an example of a virtualization environment in which functions implemented by some embodiments may be virtualized.

FIG. 29 is a schematic block diagram illustrating an example of a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 29, hardware QQ330 may be a stand-alone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 29.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

Figure 30:
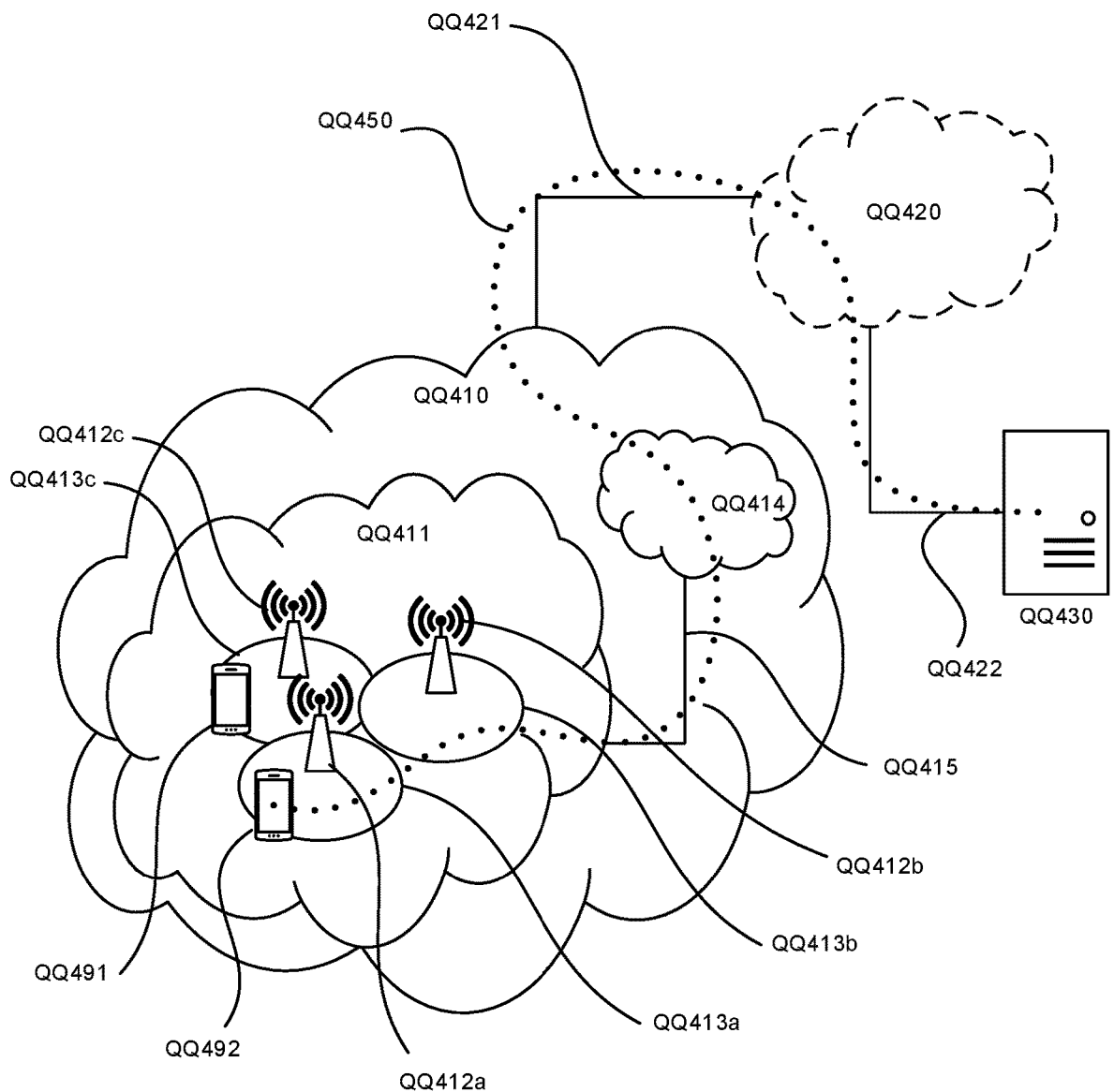
FIG. 30 is a schematic diagram illustrating an example of a telecommunication network connected via an intermediate network to a host computer in accordance with some embodiments.

FIG. 30 is a schematic diagram illustrating an example of a telecommunication network connected via an intermediate network to a host computer in accordance with some embodiments.

With reference to FIG. 30, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c, A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 30 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Figure 31:
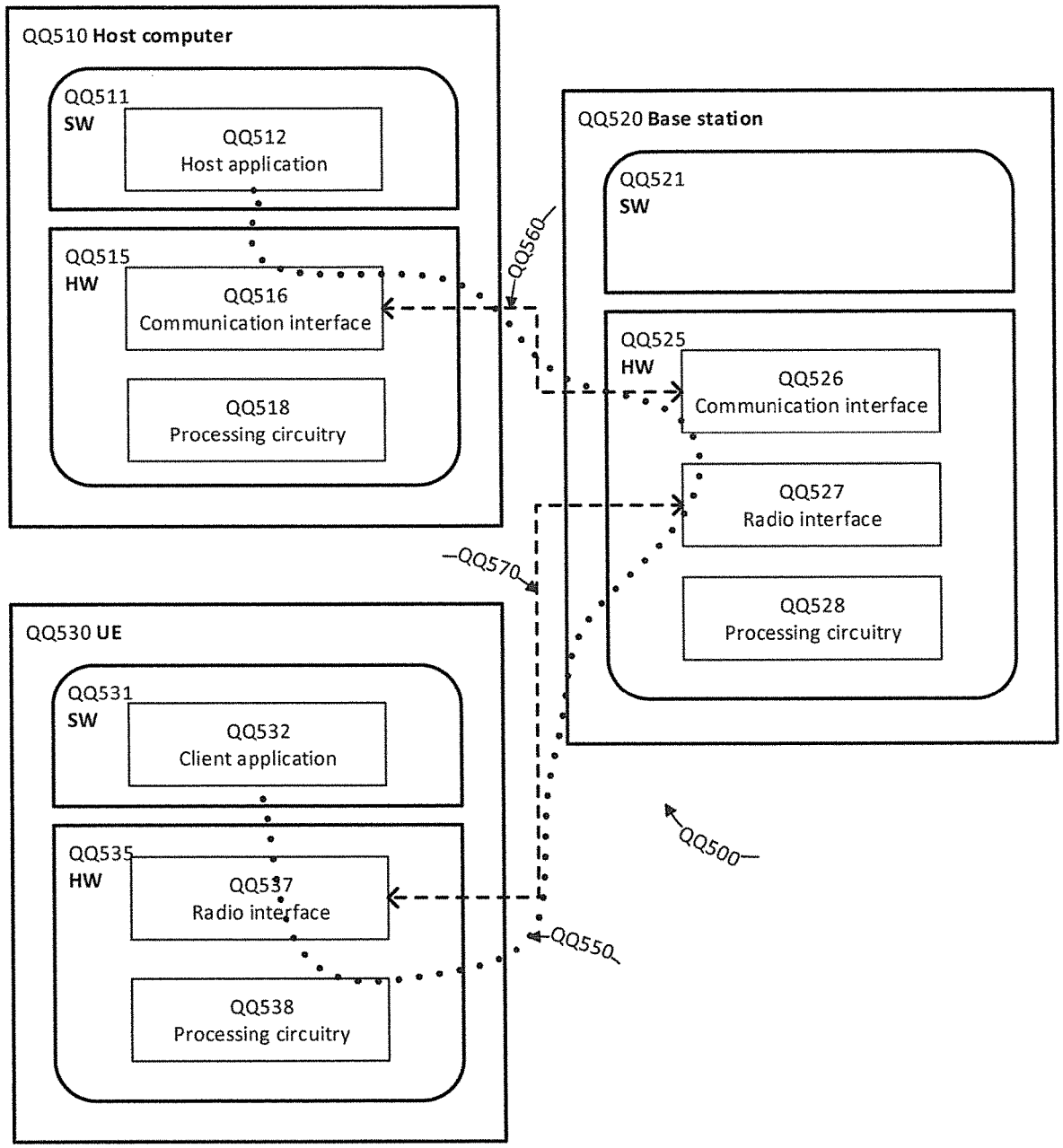
FIG. 31 is a schematic diagram illustrating an example of a host computer communicating via a base station with a user equipment over a partially wireless connection in accordance with some embodiments.

FIG. 31 is a schematic diagram illustrating an example of a host computer communicating via a base station with a user equipment over a partially wireless connection in accordance with some embodiments Example implementations, in accordance with an embodiment, of the UE, base station and host computer discussed in the preceding paragraphs will now be described with reference to FIG. 31. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well, as radio interface QQ527 for setting up and maintaining at least wireless connection QQ570 with UE QQ530 located in a coverage area (not shown in FIG. 31) served by base station QQ520. Communication interface QQ526 may be configured to facilitate connection QQ560 to host computer QQ510. Connection QQ560 may be direct or it may pass through a core network (not shown in FIG. 31) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. The hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing, circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

It is noted that host computer QQ510, base station QQ520 and UE QQ530 illustrated in FIG. 31 may be similar or identical to host computer QQ430, one of base stations QQ412a, QQ412b, QQ412c and one of UEs QQ491, QQ492 of FIG. 30, respectively. This is to say, the inner workings of these entities may be as shown in FIG. 31 and independently, the surrounding network topology may be that of FIG. 30.

In FIG. 31, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550 in which wireless connection QQ570 forms the last segment.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 32A:
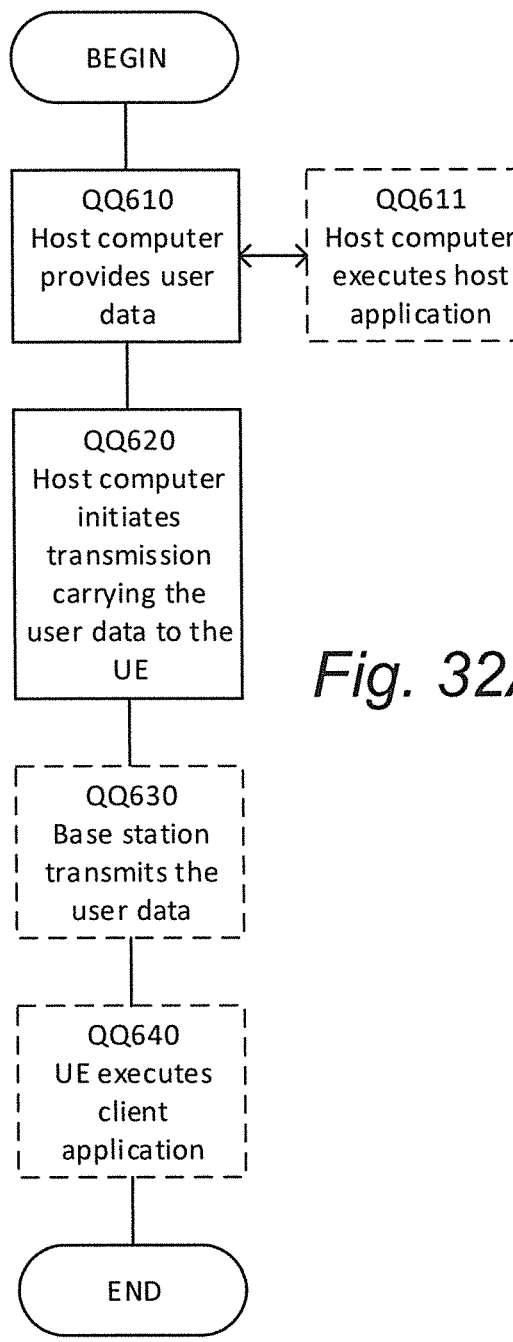
FIGS. 32A-B are schematic flow diagrams illustrating examples of methods implemented in a communication system including, e.g. a host computer, and optionally also a base station and a user equipment in accordance with some embodiments.
Figure 32B:
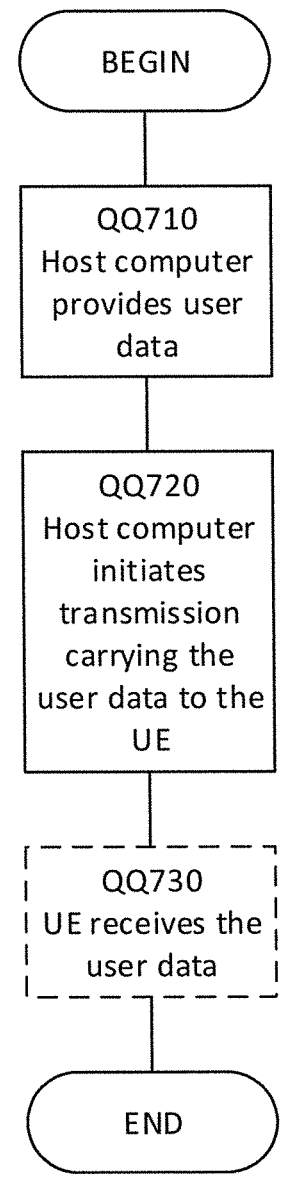

FIGS. 32A-B are schematic flow diagrams illustrating examples of methods implemented in a communication system including, e.g. a host computer, and optionally also a base station and a user equipment in accordance with some embodiments.

FIG. 32A is a flowchart illustrating a method implemented in a communication system, in accordance with one embodiment. The communication system includes a host computer, a base station and a UE which may be those described with reference to FIG. 30 and FIG. 31. For simplicity of the present disclosure, only drawing references to FIG. 32A will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

FIG. 32B is a flowchart illustrating a method implemented in a communication system, in accordance with one embodiment. The communication system includes a host computer, a base station and a UE which may be those described with reference to FIG. 30 and FIG. 31. For simplicity of the present disclosure, only drawing references to FIG. 32B will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 33A:
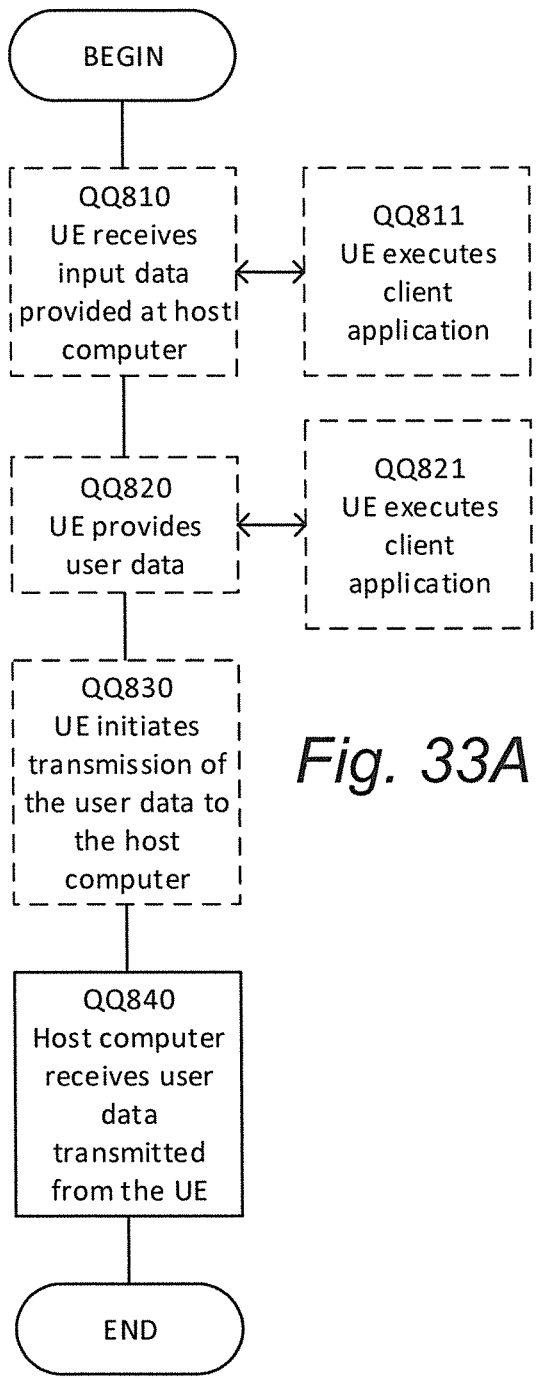
FIGS. 33A-B are schematic diagrams illustrating examples of methods implemented in a communication system including a host computer, a base station and a user equipment in accordance with some embodiments.
Figure 33B:
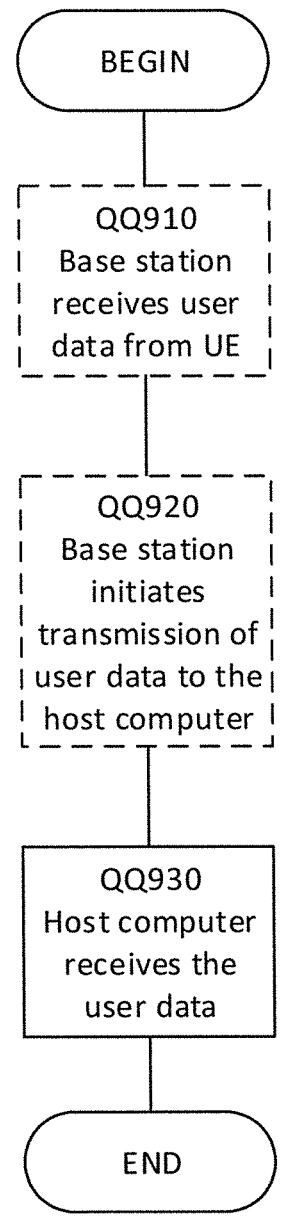

FIGS. 33A-B are schematic diagrams illustrating examples of methods implemented in a communication system including a host computer, a base station and a user equipment in accordance with some embodiments.

FIG. 33A is a flowchart illustrating a method implemented in a communication system, in accordance with one embodiment. The communication system includes a host computer, a base station and a UE which may be those described with reference to FIG. 30 and FIG. 31. For simplicity of the present disclosure, only drawing references to FIG. 33A will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

FIG. 33B is a flowchart illustrating a method implemented in a communication system, in accordance with one embodiment. The communication system includes a host computer, a base station and a UE which may be those described with reference to FIG. 30 and FIG. 31. For simplicity of the present disclosure, only drawing references to FIG. 33B will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

In the following, examples of illustrative and non-limiting embodiments will be given:

There is provided a method performed by a network node such as a base station as described herein.

Optionally, the method further comprises:
obtaining user data; and
forwarding the user data to a host computer or a wireless device.

There is also provided a network node such as a base station comprising processing circuitry configured to perform any of the steps of the method described herein.

There is further provided a communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured to perform any of the steps of the method described herein.

In a particular example embodiment, the communication system further includes the base station.

In yet another example embodiment, the processing circuitry of the host computer is configured to execute a host application, thereby providing the user data; and the UE comprises processing circuitry configured to execute a client application associated with the host application.

There is also provided a method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station performs any of the steps of the method described herein.

In a particular example embodiment, the method further comprises, at the base station, transmitting the user data.

In yet another example embodiment, the user data is provided at the host computer by executing a host application, and the method further comprises, at the UE, executing a client application associated with the host application.

There is further provided a communication system including a host computer comprising a communication interface configured to receive user data originating from a transmission from a user equipment (UE) to a base station, wherein the base station comprises a radio interface and processing circuitry, the base station's processing circuitry configured to perform any of the steps of the method described herein.

In a particular example, the communication system includes the base station.

In yet another example embodiment, the communication system further includes the UE, wherein the UE is configured to communicate with the base station.

By way of example, the processing circuitry of the host computer may be configured to execute a host application; and the UE may be configured to execute a client application associated with the host application, thereby providing the user data to be received by the host computer.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

Abbreviations

At least some of the following abbreviations may be used in this disclosure. If there is an inconsistency between abbreviations, preference should be given to how it is used above. If listed multiple times below, the first listing should be preferred over any subsequent listing(s).
1xRTT CDMA2000 1x Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation.
DMRS Demodulation Reference Signal
DRX Discontinuous Reception
DTX Discontinuous Transmission DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A radio access network node for a wireless communication system,
wherein the radio access network node is configured to be implemented as a clustered system comprising a cluster of at least two interconnected network node sub-modules, each of which comprises a processing unit and memory, and the memory comprises a data structure,
wherein at least one of the network node sub-modules is configured to manage at least one radio and/or antenna unit,
wherein the radio access network node has a communication mechanism for communication between the network node sub-modules, and the communication mechanism is configured to enable a remote direct memory write operation from at least one network node sub-module into the data structure of at least one other network node sub-module,
wherein the processing unit of at least one of said network node sub-modules is configured to directly address a storage location in the data structure of at least one other network node sub-module and perform a remote direct memory write operation for storing data into the data structure of said at least one other network node sub-module.

2. The radio access network node of claim 1, wherein at least part of the radio access network node functionality is configured to be distributed in the cluster of interconnected network node sub-modules.

3. The radio access network node of claim 1, wherein the radio access network node is configured to be implemented as a distributed application running on the cluster of interconnected network node sub-modules.

4. The radio access network node of claim 1, wherein at least one of said network node sub-modules is configured to perform baseband processing, packet processing and/or control processing.

5. The radio access network node of claim 1, wherein the processing unit of at least one of said network node sub-modules is configured to copy-write data into a cache or other dedicated local memory of the processing unit of said at least one other network node sub-module or to write the data directly into the cache or other dedicated local memory of the processing unit of said at least one other network node sub-module.

6. The radio access network node of claim 1, wherein the data structure in the memory of at least one of said network node sub-modules comprises a separate area dedicated for each of at least a subset of said network node sub-modules of the cluster.

7. The radio access network node of claim 1, wherein at least a subset of the network node sub-modules are configured to cooperate on a shared execution task, and wherein at least one of the cooperating network node sub-modules is configured to replicate data to be shared as a copy by using remote write into the data structure of at least one of the other cooperating network node sub-modules.

8. The radio access network node of claim 7, wherein at least one of the cooperating network node sub-modules is configured to perform, in response to an update of its own data structure with data to be shared, a multicasting write procedure to replicate the data in the data structures of the other cooperating network node sub-modules.

9. The radio access network node of claim 1, wherein the cluster of interconnected network node sub-modules are physically centralized in the same location.

10. The radio access network node of claim 1, wherein the cluster of interconnected network node sub-modules are physically distributed.

11. The radio access network node of claim 10, wherein the radio and/or antenna units of the radio access network node are distributed and each of at least a subset of the network node sub-modules is integrated physically with the corresponding radio and/or antenna unit.

12. The radio access network node of claim 1, wherein the network node sub-modules are configured to communicate based on a cluster interconnect using direct links and/or indirect links between the network node sub-modules.

13. The radio access network node of claim 1, wherein the network node sub-modules are configured to communicate based on a cluster interconnect using a full mesh with direct links between the network node sub-modules, or
wherein the network node sub-modules are configured to communicate based on a cluster interconnect using a mesh with direct links and/or multi-hop links between the network node sub-modules; or
wherein the network node sub-modules are configured to communicate based on a cluster interconnect using a switched network to interconnect the network node sub-modules.

14. A method of operating a radio access network node for a wireless communication system, wherein the radio access network node is implemented as a clustered system comprising a cluster of at least two interconnected network node sub-modules, each of which comprises a processing unit and memory, wherein the memory comprises a data structure, the method comprising:
at least one of the network node sub-modules managing at least one radio and/or antenna unit, and
at least one of the network node sub-modules performing a remote direct memory write operation into the data structure of at least one other network node sub-module,
wherein the step of performing a remote direct memory write operation comprises the processing unit of at least one network node sub-module performing the remote direct memory write operation for storing data into the data structure of at least one other network node sub-module, and
wherein the step of the processing unit of at least one network node sub-module performing the remote direct memory write operation comprises the processing unit of said at least one network node sub-module directly addressing a storage location in the data structure of at least one other network node sub-module.

15. The method of claim 14, wherein a distributed radio access network node application is executed on the cluster of interconnected network node sub-modules for providing at least part of the radio base functionality.

16. The method of claim 14, wherein the step of managing at least one radio and/or antenna unit comprises at least one network node sub-module performing baseband processing, packet processing and/or control processing.

17. The method of claim 14, wherein the processing unit of at least one network node sub-module performs a copy-write of data into a cache or other dedicated local memory of the processing unit of said at least one other network node sub-module or writes the data directly into the cache or other dedicated local memory of the processing unit of said at least one other network node sub-module.

18. The method of claim 14, wherein the data structure in the memory of at least one of the network node sub-modules is organized with a separate area dedicated for each of at least a subset of said network node sub-modules of the cluster.

19. The method of claim 14, wherein at least a subset of the network node sub-modules cooperate on a shared execution task, and data to be shared among cooperating network node sub-modules is replicated as a copy using remote write from at least one of the cooperating network node sub-modules into the data structure of at least one of the other cooperating network node sub-modules.

20. A non-transitory computer readable medium for operating, when executed, a radio access network node for a wireless communication system, wherein the radio access network node is implemented as a clustered system comprising a cluster of at least two interconnected network node sub-modules, wherein the computer program comprises instructions, which when executed by at least one processor, cause the at least one processor to:
enable at least one of the network node sub-modules to manage at least one radio and/or antenna unit, and
enable at least one of the network node sub-modules to perform a remote direct memory write operation into a data structure of at least one other network node sub-module, and
enable a processing unit of at least one of said network node sub-modules to directly address a storage location in the data structure of at least one other network node sub-module and perform a remote direct memory write operation for storing data into the data structure of said at least one other network node sub-module.

* * * * *